(12) United States Patent
Fujii

(10) Patent No.: US 6,620,385 B2
(45) Date of Patent: Sep. 16, 2003

(54) METHOD AND APPARATUS FOR PURIFYING A GAS CONTAINING CONTAMINANTS

(75) Inventor: Toshiaki Fujii, Kanagawa (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/853,762

(22) Filed: May 14, 2001

(65) Prior Publication Data

US 2002/0170815 A1 Nov. 21, 2002

Related U.S. Application Data

(63) Continuation of application No. 09/147,697, filed as application No. PCT/JP97/02863 on Aug. 19, 1997, now abandoned.

(30) Foreign Application Priority Data

Aug. 20, 1996 (JP) ............................................. 8/235832
Jan. 22, 1997 (JP) ............................................. 9/21947
Jan. 31, 1997 (JP) ............................................. 9/31441

(51) Int. Cl.[7] .............................................. B01J 19/08
(52) U.S. Cl. ..................... 422/186.3; 422/121; 422/122
(58) Field of Search ..................... 422/186.04, 186.3, 422/121, 122

(56) References Cited

U.S. PATENT DOCUMENTS

| 5,015,442 A | 5/1991 | Hirai |
| 5,225,000 A | 7/1993 | Fujii et al. |
| 5,380,503 A | 1/1995 | Fujii et al. |
| 5,993,738 A | 11/1999 | Goswani |

FOREIGN PATENT DOCUMENTS

| JP | 63-93327 | 4/1988 |
| JP | 1-159032 | 6/1989 |
| JP | 7-57981 | 3/1995 |

*Primary Examiner*—Kishor Mayekar
(74) *Attorney, Agent, or Firm*—Oblon, Spivak, McClelland, Maier & Neustadt, P.C.

(57) ABSTRACT

A method and an apparatus for purifying a gas containing contaminants are disclosed. The gas is irradiated with an ultraviolet ray and/or a radiation ray so as to produce microparticles of the contaminants. The resultant microparticles of the contaminants are contacted with a photocatalyst. Then, the photocatalyst is irradiated with light so as to decompose the contaminants held in contact with the photocatalyst. Organic compounds, organosilicon compounds, basic gas and the like can be decomposed by the action of the photocatalyst. Even when these species are present at a low concentration, they can be concentrated locally by transforming into microparticles, and hence can be removed.

11 Claims, 13 Drawing Sheets

METHOD AND APPARATUS FOR PURIFYING A GAS CONTAINING CONTAMINANTS

This application is a continuation of application Ser. No. 09/147,697 filed on Feb. 18, 1999, now abandoned, which was originally filed as International Application No. PCT/JP97/02863, filed Aug. 19, 1997.

BACKGROUND OF THE INVENTION

The disclosures of the Japanese Patent Applications Nos. Hei-8-235832 filed on the Aug. 20, 1996 and Hei-9-31441 filed on the Jan. 31, 1997 are incorporated herein by reference.

FIELD OF THE INVENTION

The present invention relates to a method and an apparatus for purifying a gas containing contaminants. More specifically, the present invention relates to a method and an apparatus for purifying a gas by producing microparticles of the contaminants present in a gas and decomposing the resultant microparticles of contaminants with a photocatalyst for facilitating the removal thereof.

RELATED ART

It was considered satisfactory in semiconductor industries in the past to remove only solid particles such as dust from a gas such as air in a clean room. Methods for removing solid particles can be classified broadly into 2 categories: (1) mechanical filtration methods (e.g. HEPA (High Efficiency Particulate Air) filter); and (2) methods for trapping microparticles electrostatically (e.g. MESA filter). Methods included in the category (2) comprise charging microparticles electrically with a high electrical voltage and filtering the charged microparticles with an electrically conductive filter. Gaseous contaminants, however, cannot be removed by any method of either category.

Development of semiconductors of higher quality and finer precision has made it necessary to remove not only dust-like solid particles but also gaseous contaminants. Gaseous contaminants include: organic compounds including phthalic esters; organosilicon compounds including siloxane; acidic gases including sulfur oxides (SOx), nitrogen oxides (NOx), hydrogen chloride (HCl) and hydrogen fluoride (HF); as well as basic gases including $NH_3$ and amines. Amines may be included among organic compounds also. Anions such as $NO_3^-$, $NO_2^-$, $SO_4^{2-}$, etc. have characteristics and exert adverse effects similar to acidic gases, and therefor, are considered as a member of acidic gases out of convenience. Likewise, cations such as $NH_4^+$, etc. have characteristics and exert adverse effects similar to basic gases, and therefor, are considered as a member of basic gases for convenience.

Organic compounds or organosilicon compounds, when deposited onto the surface of a wafer (substrate), may have a negative effect on the affinity (drapability) of a substrate for a resist. Decreased affinity may exert a harmful influence on both the film thickness of a resist and the adhesion of a substrate to a resist ("Air Cleaning", Vol. 33, No. 1, pp. 16–21, 1995). For example, SOx may bring about defective insulation in an oxide layer. $NH_3$ may produce ammonium salts that are responsible for the blooming (poor resolution) of a wafer (Realize Inc., "Saishin Gijyutsu Kozau, Shiryo-shu", Oct. 29, 1996, pp. 15–25, 1996). For the aforementioned reasons, such gaseous contaminants may diminish the productivity (yield) of semiconductor products.

It was also considered satisfactory in the past to remove gaseous contaminants to a level of ppm. It has become required now to remove gaseous contaminants to a level of ppb. Among organic compounds, alkanes such as methane and the like are not so reactive as to exert an unfavorable influence on a semiconductor, and hence are not required to be removed to a level of ppb.

Removal of contaminants including organic compounds, especially gaseous organic compounds is described below in more detail.

Known methods for removing organic compounds include decomposition by combustion, catalytic decomposition, removal by adsorption, decomposition with $O_3$ and the like. These known methods, however, are not effective in removing organic compounds present in low concentrations in air for feeding a clean room.

In a clean room, contamination with organic compounds of an extremely slight concentration cannot be ignored. External organic compounds may be introduced into a clean room. For example, outdoor air is contaminated with organic compounds originating from exhaust gas of cars or those resulting from degassing of polymer products. On the other hand, internal organic compounds may be generated in a clean room. For example, polymer materials (e.g. polymeric plasticizers, releasers, antioxidants and the like) which are used for constructing a clean room are producers of organic gases ("Air Cleaning", Vol. 33, No. 1, pp. 16–21, 1995). Synthetic polymers are used in packing materials, sealants, adhesives and wall-forming materials in a clean room. In addition, plastic containers are disposed in a clean room. These synthetic polymers may evolve a trace amount of organic gases. More particularly, sealants and the production units thereof may give off gaseous siloxane, and plastic containers may give off gaseous phthalic esters. It has recently been found that gas evolves also from polymer materials employed in a production unit. A process unit is partially or entirely surrounded by plastic plates which also produce organic gas. A variety of solvents (e.g. alcohols, ketones, etc., which are necessary for operations in a clean room are also a contamination source.

As stated above, a clean room is contaminated variously and heavily with not only organic compounds attributable to external air but also with organic compounds and organosilicon compounds that are generated internally.

In view of energy saving considerations, recycling of air in a clean room has become more frequent recently. In consequence, organic gases are progressively concentrated in a clean room, leading to heavier contamination of the base materials of a wafer and a substrate. These organic compounds are likely to deposit onto the bodies (e.g., starting materials and semi-fabricated products of a semiconductor wafer, a glass substrate, etc.) placed in a clean room, adversely affecting them.

A contact angle indicates a degree of contamination on a wafer substrate with organic compounds and organosilicon compounds. The contact angle refers to the angle formed by the water and the surface of a substrate when the surface is wet with water. The surface of a substrate, when covered with a hydrophobic (oily) substance, becomes more water-repellent and less wettable, hence the contact angle of water on the surface of a substrate becomes larger. In other words, when the contact angle is larger, the degree of contamination is higher. On the contrary, when the contact angle is smaller, the degree of contamination is lower.

When a substrate is contaminated with organic compounds and organosilicon compounds, its affinity (drapability) for a resist decreases, imparting an unfavorable influence on the resist and the film thickness or on the adhesion of the substrate to the resist, that may result in lower quality and a lower yield.

Techniques in the high-technology field have made remarkable progress in realizing semiconductor devices of a maximal precision and a minimal size. In consequence, it has become necessary for a clean room to be free from organic compounds normally present in the air of the level that had conventionally been able to be ignored (an extremely low concentration of the ppb level) [Preparatory Manuscripts for the 39th Meeting of the Applied Physical Society, p.86 (1992, Spring); "Air Cleaning", Vol. 33, No. 1, pp. 16–21, (1995)], as well as gaseous contaminants including $SO_2$, HF, $NH_3$ ["Ultra Clean Technology", Vol. 6, pp. 29–35 (1994)]. Because, it has been revealed that the presence of these gaseous contaminants diminished remarkably the productivity (yield). The present invention is aiming to efficiently remove these gaseous contaminants.

The present inventors have proposed a method for removing hydrocarbons present in a gas comprising the steps of: irradiating the gas with an ultraviolet ray and/or a radiation ray so as to produce microparticles from the hydrocarbon; and trapping the resultant hydrocarbon microparticles with a filter or charging the hydrocarbon microparticles electrically with a photoelectron and trapping the resultant charged microparticles (Laid Open Japanese Patent Application No. Hei-5-96125). A similar method can be applied also to noxious matter present in a gas (Laid Open Japanese Patent Application No. Hei-4-243517).

Using the methods mentioned above, however, trapped microparticles become accumulated on the filter or in the part for trapping the charged microparticles, thus requiring frequent changing of the filter or the trapping part. Further, when the accumulated microparticles fall from the filter or from the trapping part, the fallen microparticles, even if they are in extremely small amounts, inadvertently contaminate a gas to be purified. Therefore, it is considered preferable to decompose contaminants than to remove them.

A conventional removing method is now described with reference to FIGS. 16 and 17. As shown in FIG. 16, the air which is fed to a clean room 1 in a recycled manner is composed of the external air that is fed via a pipe 2 and is cleared of coarse particles through a prefilter 3 and the internal air that is drawn out of the clean room 1 through an air outlet 4. Both airs are combined in a fan 5, conditioned in temperature and moisture with an air conditioner 6 and cleared of microparticles with a HEPA filter 7. The air in the clean room is kept at a purity (class) of the order of 10,000. In this specification, the term "class" refers to the number of particles having a particle diameter of not less than 0.1 $\mu$m that are present per cubic feet.

A clean bench 51 is disposed in the clean room 1 to trap and remove a trace amount of hydrocarbons and microparticles (particulate matter).

Organic compounds present in the clean room 1 may consist presumably of those that originating in external air introduced through the pipe 2 (those that are presumably discharged from cars and synthetic resins) and those that are produced during operations in the clean room.

The clean bench 51 comprises mainly a microparticle-producing section 48, a microparticle-charging section 49 and a section for trapping charged microparticles 50. A highly pure air (of class 10) that is freed of both organic compounds and coexistent microparticles is fed above a working table 53, where operations are being carried out.

In other words, air having a purity (class) in the order of 10,000 and containing a trace amount of organic compounds originating in the clean room 1 is directed with a fan (not shown) toward the clean bench 51. At the clean bench 51, the microparticle-producing section 48 is provided for irradiating the air with an ultraviolet radiation of a short wavelength so as to produce microparticles of organic compounds contained in the air. Then, in the microparticle-charging section 49, the microparticles are electrically charged efficiently with photoelectrons emitted by a photoelectron-emitting material as described hereinbelow. The resultant charged microparticles are trapped and removed in the section for trapping charged microparticles 50 that follows. In this manner, air above the working table 53 can be maintained to be highly pure and free of organic compounds.

A movable shutter is provided on the clean bench 51 for facilitating introduction and/or withdrawal of instruments and products into and/or out of the working table 53.

FIG. 17 shows schematically a microparticle-producing section 48, a microparticle-charging section 49 and a section for trapping charged microparticles 50. These sections are described just below with reference to FIG. 17.

In other words, air 54 aspirated through a fan (not shown) and containing a trace amount of organic compounds is filtered through a prefilter (not shown), and then irradiated with an ultraviolet radiation of a short wavelength in the microparticle-producing section 48 that is mainly consisting of an UV lamp 55. Organic compounds present in the air 54 are transformed into microparticles 56 by UV irradiation. These microparticles 56, together with naturally-occurring microparticles 57 already present in the introduced air 54, are electrically charged in the microparticle-charging section 49 so as to become charged microparticles 58.

The microparticle-charging section 49 is mainly composed of an UV lamp 59, a photoelectron-emitting material 60 (herein consisting of a glass material having a surface coated with an Au thin layer of a thickness of 5 to 50 nm, for example) and an electrode material 61 for generating an electrical field. The photoelectron-emitting material 60 is irradiated with the UV lamp 59 in the presence of an electrical field so as to emit photoelectrons 62, which in turn supply the microparticles 56, 57 with an electrical charge so as to produce the charged microparticles 58, which can then be trapped in the section for trapping charged microparticles 50 that follows. The section 50 consists of a material for trapping the charged microparticles. Reference numeral 63 indicates an UV-transmissive material. Reference numeral 64 indicates a highly pure air that is dust-free and free from organic compounds.

The arrangement as stated above is suffered from the problems as set forth below:

(1) Microparticles that were produced from organic compounds upon irradiation with an ultraviolet ray and/or a radiation ray often failed to result in complete trapping with a filter or complete charging and trapping with photoelectrons, depending on the irradiation conditions and the kinds of organic compounds. This is probably because some kinds of organic compounds tend to produce microparticles of an extremely small size. Or else, the chemical composition of organic compounds may be responsible for it. In case when the trapping efficiency was low, a trapping section having a larger volume was required, hence making the whole apparatus larger.

(2) Produced particulate matter can be trapped at the trapping section 50. Consequently, this particulate matter tends to accumulate in the trapping section during a long-term continuous operation. This requires a design of a trapping section 50 having a higher trapping volume, thus making the size of an apparatus larger.

On the other hand, the present inventors have proposed the use of a photocatalyst in a system for removing organic compounds (Japanese Patent Applications Nos. Hei-8-31230 and Hei-8-31231). In this system, however, organic compounds in a low concentration are decomposed with a photocatalyst so slowly that the decomposition thereof is very time-consuming. In other words, diethylhexyl phthalate (DOP) and siloxane present in the natural air and the air in a clean room are only in a concentration as low as about 1 ppb each.

Further, photocatalysts cannot effectively remove acidic gases such as $SO_2$, NO, HCl and HF. In particular, sulfur-containing compounds such as sulfur oxides, hydrogen sulfide, thiophene and thiols, when present at a high concentration, may sometimes act as a catalytic poison to the photocatalysts. Even if these compounds can avoid acting as a catalytic poison, they might adversely influence on the photocatalysts after a long-term operation.

SUMMARY OF THE INVENTION

The present invention is directed to solve the problems as set forth above.

According to one aspect of the present invention, there is provided a method for purifying a gas containing a contaminant comprising a microparticle-producing step for irradiating the gas with an ultraviolet ray and/or a radiation ray so as to produce microparticles of the contaminant, a contact step for contacting the microparticles of the contaminant with a photocatalyst and a first decomposition step for irradiating the photocatalyst with a light so as to decompose the contaminant being in contact with the photocatalyst. Organic compounds (except for alkanes), organosilicon compounds and basic gases can be oxidatively decomposed with a photocatalyst. Even when contaminants are present in small amounts, they can be concentrated locally by transforming into microparticles, and hence can be oxidatively decomposed with a photocatalyst efficiently.

In the microparticle-producing step, an ultraviolet ray and/or a radiation ray having a wavelength of not more than 260 nm is preferably used. Contaminants can aggregate through a radical reaction to produce microparticles.

Preferably, the gas contains water or gaseous oxygen in a concentration of not less than 1 ppb. More preferably, the gas contains water or gaseous oxygen in a concentration of not less than 100 ppb. It is believed that water or gaseous oxygen acts on the surface of a photocatalyst by supplying it with OH radical to induce activation of the photocatalyst. The OH radical probably acts as an oxidant in the presence of the photocatalyst.

It is preferred that: a gas contains gaseous oxygen of at least 1 ppm; the gaseous oxygen present in the gas is transformed into ozone at the microparticle-producing step; and the method further comprises a second decomposition step for decomposing the resultant ozone.

More preferably, the method comprises a removal step for removing contaminants. Preferably, the contaminants contain acidic or basic compounds, and more preferably, the contaminants contain at least one species selected from the group consisting of nitrogen oxides (NOx), nitrogen oxide ions, sulfur oxides (SOx), sulfur oxide ions, hydrogen sulfide, hydrogen fluoride, ammonia and amines.

The removal step may precede the microparticle-producing step. Alternatively, the removal step may follow the microparticle-producing step and precede the first decomposition step. The latter order is suitable when there is contained any contaminant serving as poison to a photocatalyst. More precisely, when sulfur-containing compounds such as sulfur oxides, hydrogen sulfide, thiophene and thiols are present, it is preferred that these compounds are removed prior to the treatment with the photocatalyst. Alternatively, the removal step may follow immediately after the first decomposition step.

Preferably, the removal step is carried out by means of one or more of a filter, an adsorbent, an ion exchanger and a photoelectron. Photoelectrons can supply contaminants with an electrical charge so as to facilitate the trapping of the contaminants.

Preferably, the photocatalyst is composed of a matrix and a catalytically active component which is carried on the matrix and which is preferably in the form a particle. More preferably, the matrix is in the form of a honeycomb structure provided with partitions defining at least 2 through-holes, a bar body or a wall member, and the catalytically active component is semiconductor.

According to the second aspect of the present invention, there is provided an apparatus for purifying a gas containing a contaminant comprising: a microparticle-producing section having a source of an ultraviolet ray and/or a radiation ray; and a decomposition section having a photocatalyst and a light source for irradiating the photocatalyst, the decomposition section being connected to the microparticle-producing section.

Preferably, the apparatus is provided with a gas inlet and a gas outlet and is disposed in a manner that the gas inlet, the microparticle-producing section, the decomposition section and the gas outlet are arranged successively downstream.

More preferably, an ozone-decomposing material is provided downstream to the microparticle-producing section.

In addition, it is preferred to provide a removal section for removing acidic and/or basic compounds. Preferably, the removal section comprises one or more means selected from a filter, an adsorbent and an ion exchanger as well as a photoelectron-emitting means and a means for trapping charged contaminants.

DETAILED DESCRIPTION OF THE INVENTION

Figure 1:
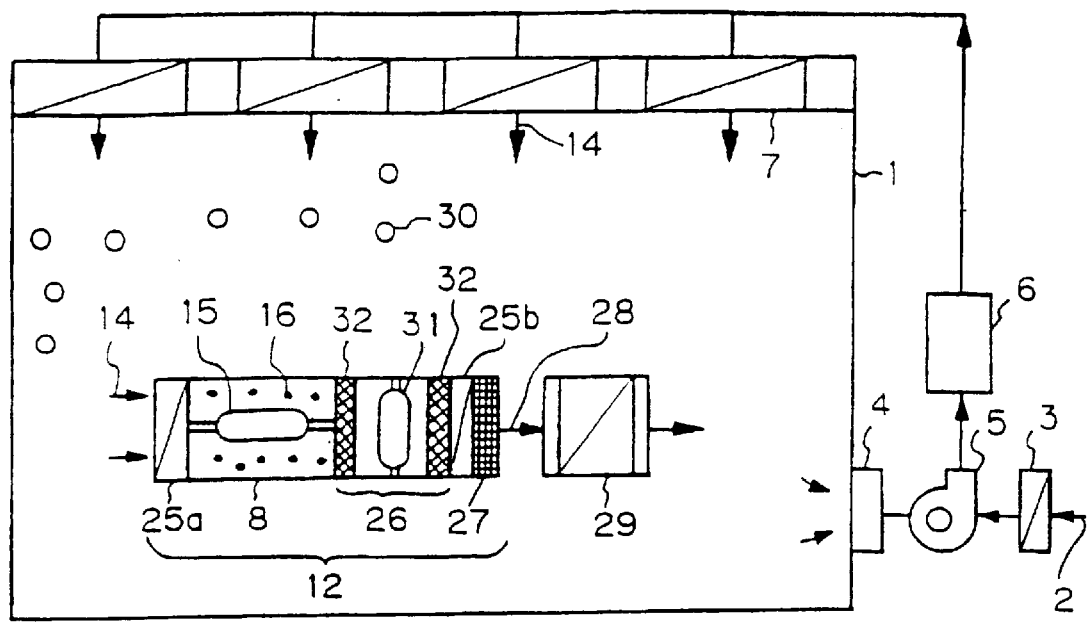
FIG. 1 is a general view of a clean room having a purification apparatus of the present invention disposed therein.

According to the present invention, a gas containing contaminants is purified. Contaminants which can be removed by the present invention are mainly gaseous contaminants including: organic compounds (except for alkanes such as methane); organosilicon compounds such as siloxane; acidic gases such as sulfur oxides (SOx), nitrogen oxides (NOx), hydrogen chloride (HCl) and hydrogen fluoride (HF); as well as basic gases such as $NH_3$ and amines.

Organic compounds include: aliphatic hydrocarbons, especially lower aliphatic hydrocarbons having 1 to 40 carbon atoms, such as alkene, alkyne and the like; aromatic hydrocarbons, especially lower aromatic hydrocarbons having 1 to 40 carbon atoms, such as benzene, naphthalene and the like; alcohols, especially lower alcohols having 1 to 40 carbon atoms; phenols; carboxylic acids such as higher fatty acids; carboxylic acid derivatives such as esters, amides, acid anhydrides and the like; ethers; amines; as well as sulfur-containing compounds such as sulfoxides, mercaptons, thiols and the like. Examples of aromatic hydrocarbons which can be removed by the present invention include benzene, toluene, ethylbenzene and the like.

Carboxylic acid derivatives include phthalic esters such as butyl phthalate originating in synthetic polymers the phthalic esters and hence can be removed by the present invention.

Nitrogen-containing heterocycles such as pyrrole and pyridine, oxygen-containing heterocycles such as furan and tetrahydrofuran, as well as sulfur-containing heterocycles such as thiophene can be removed as well.

Halogenated hydrocarbons include: halogen-containing aliphatic compounds including trihalomethane such as chloroform as well as trichlorofluoromethane, dichloromethane and dichloroethane; halogen-containing aromatic compounds such as chlorophenol.

On the other hand, contaminants do not include alkanes such as methane and the like, since they are less reactive and are difficult to deposit onto a substrate made of a semiconductor and the like. Hence, alkanes are not required to be removed by the present invention. Alkanes having at most 4 carbon atoms are more difficult to deposit onto a semiconductor substrate and those having at most 3 carbon atoms are still more difficult to deposit onto a semiconductor substrate.

The present invention will now be described in more detail section by section.

According to the present invention, a gas containing contaminants such as gaseous contaminants is irradiated with an ultraviolet ray and/or a radiation ray. An apparatus of the present invention comprises a microparticle-producing section having a source of an ultraviolet ray and/or a radiation ray.

The microparticle-producing section has an irradiation source for transforming gaseous contaminants such as organic compounds present in a gas into microparticles (condensable matter or particulate matter). Any irradiation source can be used, provided that it allows organic compounds and coexistent gaseous contaminants such as $SO_2$ and $NH_3$ to transform into microparticles or particulate matter. Any of electromagnetic waves, lasers, radiations can be used as desired in addition to ultraviolet rays. Also, suitable irradiation sources can be selected on the basis of the results of preliminary experiments, depending on fields of application, compositions and concentrations of the gaseous contaminants to be removed, sizes and shapes of apparatuses as well as economical efficiency. Usually, irradiation with an ultraviolet or a radiation ray is preferred.

Upon irradiation, the contaminants present in the gas are transformed into particulate matter (condensable matter) optionally accompanied by active matter (condensable matter), depending on the constituents thereof and other matter coexistent therewith. For example, when a gaseous mixture containing toluene, isopentane and propylene as organic compounds is irradiated with an ultraviolet ray, carboxylic acids and carbonyl compounds (condensable matter or active matter) are produced.

The presence of higher aliphatic acids having a high molecular weight, phenol derivatives, phthalic esters (e.g. DBP, DOP) and siloxane in a clean room has recently become a serious problem, since they are included among the organic compounds that deposit onto a substrate including wafer and induce an increase in the contact angle ("Air Cleaning", Vol. 33, No.1, pp. 16–21, 1995). DBP is an abbreviation of dibutyl phthalate. DOP is an abbreviation of dioctyl phthalate, which is called more accurately di-(2-ethylhexyl)phthalate. Phthalic esters such as DBP, DOP and the like are useful as a plasticizer of resins, in particular of vinyl resins.

These organic compounds and organosilicon compounds including siloxane are transformed into particulate matter upon irradiation with an ultraviolet ray and/or a radiation ray. The resultant particulate matter has a particle diameter of e.g. scores of nanometers to several hundred nanometers.

This may be probably because the contaminants exposed to ultraviolet or other radiation undergo a radical reaction with gaseous oxygen and water present in a gas at a trace amount of the order of 1 ppb or more, whereby the contaminants are brought into a state of association.

According to the present invention, contaminants are transformed into microparticles as stated above. In other words, contaminants are microscopically concentrated. Then, the resultant microparticles of contaminants are decomposed with a photocatalyst.

By way of another example, the reaction schemes of $SO_2$ are set forth below:

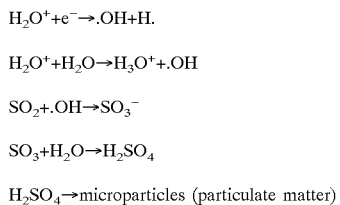

$H_2O$ means the water contained in a gas at a trace amount. During the final reaction, microparticles are produced from sulfuric acid. It may be also probable in this reaction that when a highly viscous liquid such as sulfuric acid is produced in a gas even in only a small amount, other contaminants can associate therewith to produce microparticles. The presence of a basic gas, e.g. ammonia may induce a reaction of acidic gases.

Another example of the reaction schemes is shown below:

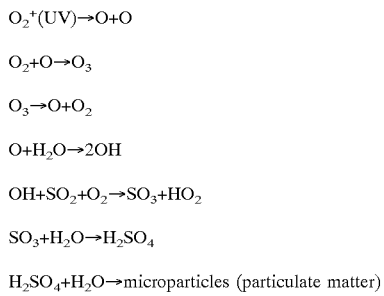

These reactions vary depending on the kinds of coexistent gases, irradiation conditions and others. As shown in the above schemes, water reacts with coexistent gaseous contaminants ($SO_2$ in this case) to afford a reaction product, which is $SO_3^-$ in the above. By transforming the reaction product into microparticles followed by trapping and removing the resultant microparticles, a gas is cleared of coexistent gaseous contaminants such as $SO_2$ and becomes highly pure. This action is not limited to $SO_2$, but is common to other various gaseous contaminants such as $NH_3$ and the like.

Transformation into microparticles (production of microparticles) can be induced effectively with an irradiation source having a wavelength of not more than 260 nm, preferably of not more than 254 nm. Usually, irradiation sources of ultraviolet and/or other radiation are preferred in view of effects and operability.

Any UV source can be used, provided that the irradiation therewith can produce microparticles of organic compounds and those of coexistent gaseous contaminants including $SO_2$ and $NH_3$ (transformation into particulate matter or condensable matter or transformation into microparticles and active matter). Suitable UV sources can be selected on the basis of the results of preliminary experiments, depending on the kinds of organic compounds and other coexistent matter. UV sources that produce oxygen-activated species (active radicals) such as active oxygen and OH radical may be preferred depending on the field of application.

In general, suitable UV irradiation sources include a mercury lamp, a hydrogen discharge tube (heavy hydrogen lamp) and the like. It is preferred to use an UV irradiation source having multiple wavelengths which can induce different actions depending on the kinds of organic compounds and coexistent gaseous contaminants including $SO_2$, $NH_3$, etc. or coexistent matter. For example, a mercury lamp can use: (1) an ozone-producing wavelength; in combination with (2) a wavelength for inducing decomposition of the resultant ozone so as to promote the production of oxygen-activated species. By way of an example, these wavelengths are respectively of 184 nm and 254 nm. Production of microparticles of organic compounds and coexistent gaseous contaminants including $SO_2$ and $NH_3$ is mainly induced at 184 nm and decomposition of the produced ozone is mainly induced at 254 nm. Ozone is preferred because it has an ability to promote transformation of gaseous contaminants into microparticles as shown in the reaction schemes set forth above.

Radiation rays which can be suitably used are α-ray, β-ray, γ-ray and the like. Irradiation means which can be used are: a radiation source utilizing radioactive isotopes such as cobalt 60, cesium 137 and strontium 90, radioactive wastes of a nuclear reactor or radioactive materials obtained therefrom through suitable processing; a radiation source utilizing directly a nuclear reactor; a radiation source utilizing a particle accelerator such as electron beam accelerator. Electron beam irradiation with an accelerator can become highly dense and effective by being applied at a low output power. An accelerating voltage is at most 500 kV, preferably in the range of 50 kV to 300 kV.

According to the present invention, contaminants in the form of microparticles are made contact with a photocatalyst. Contact includes deposition and adsorption. The present invention is intended for the removal of contaminants having a tendency to increase the contact angle on the surface of a substrate such as a wafer. These contaminants are likely to deposit not only onto the wafer surface but also onto the photocatalyst. In addition, contaminants in the form of microparticles may deposit onto the photocatalyst through Brownian motion.

According to the method of the present invention, a photocatalyst is irradiated with light. In other words, the apparatus of the present invention comprises a decomposition section including a photocatalyst and a light source for irradiating the photocatalyst.

Photocatalysts are now described. Photocatalysts are described in U.S. patent application Ser. No. 08/733,146, now U.S. Pat. No. 6,159,421, the disclosure of which is herein incorporated by reference.

Any photocatalyst can be used, provided that the excitation thereof by irradiation with light can promote an oxidative reaction. Photocatalysts can oxidatively decompose organic compounds, organosilicon compounds, basic gases such as ammonia. For example, organic compounds are decomposed into low molecular non-toxic substances, such as carbon dioxide and water. Organosilicon compounds are decomposed into carbon dioxide and water. It is not completely elucidated whether atomic silicium is oxidatively decomposed to produce $SiO_2$. Ammonia is thought to be oxidatively decomposed into gaseous nitrogen.

Photocatalysts are not required to oxidatively decompose organic compounds down to carbon dioxide. When a photocatalyst is used to prevent the increase in the contact angle on the surface of a semiconductor wafer, it is required only to transform organic compounds into the compounds playing no part in the increase in the contact angle, in other words, stable compounds having no adverse effects even if they are deposited on the surface of the semiconductor wafer.

On the other hand, photocatalysts are thought to oxidize acidic gases such as sulfur oxides, nitrogen oxides and the like, too. By way of an example, sulfur oxides (SOx) are oxidized into $SO_2$, which may possibly react with water in the air to produce sulfuric acid. Acidic gases transformed into the form of microparticles are preferably removed with any of a filter, an adsorbent or an photoelectron.

Photocatalysts contain catalytically active components, which are preferably semiconductors. Such semiconductors include: elementary semiconductors such as Si, Ge and Se; compound semiconductors such as AlP, AlAs, GaP, AlSb, GaAs, InP, GaSb, InAs, InSb, CdS, CdSe, ZnS, $MoS_2$, $WTe_2$, $Cr_2Te_3$, MoTe, $Cu_2S$ and $WS_2$; oxide semiconductors such as $TiO_2$, $Bi_2O_3$, CuO, $Cu_2O$, ZnO, $MoO_3$, $InO_3$, $Ag_2O$, PbO, $SrTiO_3$, $BaTiO_3$, $Co_3O_4$, $Fe_2O_3$, NiO, $WO_3$ and $SnO_2$. Preferable oxides are titanium oxide, titanium strontium trioxide, cadmium sulfide, zinc oxide, tungsten oxide and tin oxide, and, more preferable oxides are titanium oxide, titanium strontium trioxide and zinc oxide. Titanium oxides respectively of rutile structure and anatase structure are useful.

Cocatalysts such as Pt, Ag, Pd, $RuO_2$, $Co_3O_4$ and the like can be added to catalytically active components so as to improve the catalytic action of photocatalysts. Cocatalysts can be used alone or in combination of two or more. Cocatalysts can be added by using any of suitable well known methods such as impregnation, photoreduction, sputtering evaporation, kneading and the like.

Catalytically active components are preferably formed in the shape of a particle so as to increase the surface area thereof. When a cocatalyst is used, individual particles are composed of a photocatalyst and a cocatalyst.

A photocatalyst is preferably composed of a matrix and a catalytically active component carried on the matrix. The catalytically active component can be fixed to the matrix by being coated onto the surface of the matrix or by being wrapped in the matrix or inserted into the matrix. Matrices can be made of ceramics, fluororesins, glass, glassy materials or various metals. A matrix may be formed in the shape of a honeycomb, a wire cloth, a fiber, a rod and a filter. The term "honeycomb" as used herein means a structure provided with through-holes of any shape in cross-section. The cross-sectional shape of a through-hole may be selected from a circle, an ellipse and a polygon, for example.

By way of an example, a matrix may be a honeycomb structure provided with partitions defining two or more through-holes. A photocatalyst in the form of particles can be carried on the partitions of the honeycomb structure. The honeycomb structure may be made of ceramics. Alternatively, a metallic matrix having a net structure may have a surface coated with $TiO_2$. Or, a fibrous matrix made of glass may have a surface coated with $TiO_2$. Alternatively, a photocatalyst can be carried on a surface of a light source so as to integrate the photocatalyst with the light source as stated hereinafter (Japanese Patent Application No. Hei-8-31231, the disclosure of which is incorporated herein by reference).

A photocatalyst can be carried on a matrix by any of well known processes including a sol-gel process, sintering process, evaporation process, sputtering process, coating process, baking finish process and the like. Materials and shapes of these matrices as well as the manner of carrying catalytically active components can be selected as appropriate, depending on the size and shape of an apparatus, types and shapes of a light source, kinds of catalytically active components, desired effects, economical efficiency and the like. A method for supporting catalytically active components on a linear article such as a fiber according to sol-gel process is described in the Laid Open Japanese Patent Application No. Hei-7-256089, the disclosure of which is herein incorporated by reference.

A photocatalyst may be disposed in a space where a gas to be treated flows through. Catalytically active components may be coated on the surface of the walls, floors and ceilings that define a space prevailed by the flow of a gas to be treated.

Any light source may be used for light irradiation, provided that it can emit light having a wavelength absorbable with a photocatalyst. Light belonging to the visible and/or ultraviolet regions is effective, and hence an UV lamp or the sunlight can be appropriately applied. Examples which can be mentioned are a bactericidal lamp, a black light, a fluorescent chemical lamp, an UV-B lamp and a xenon lamp. Radiations as mentioned hereinbefore can be appropriately used. Materials of photocatalysts, materials and shapes of matrices, the presence or not of additives, types of irradiation sources and their installation mode in a gas to be treated can be appropriately selected on the basis of the results of preliminary experiments, depending on fields of application as well as sizes, shapes and required specifications of an apparatus.

The mechanisms by which organic compounds can be transformed into particles and the resultant particles of particulate matter can be decomposed in the presence of a photocatalyst are generally believed to be as described below, though many details are remaining unclear due to the fact that organic compounds are thought to be present in the air in the form of a mixture of more than hundreds or thousands of constituents.

Organic compounds in the air can be activated themselves upon exposure to an ultraviolet ray and/or a radiation ray. When water is present in the air even at a slight concentration, the water may induce the production of OH radical and/or provoke an ionic nucleation reaction. Reaction products resulted from these many complicated reactions are associated to become microparticles. Even when the organic compounds are present in an extremely low concentration, reactions can occur effectively. For example, phthalic esters such as siloxane, DOP and DBP can be easily transformed into microparticles.

The surface of a photocatalyst is activated upon irradiation of light and/or radiation. Contaminants that can easily deposit on a substrate such as a wafer can easily deposit also on a photocatalyst also. Organic compounds such as phthalic esters are hydrophilic, and therefor can easily deposit onto an active surface. Moreover, those organic compounds are concentrated in the form of microparticles, and therefore more easily deposit onto the surface of a photocatalyst. Subsequently, the contaminants are decomposed on the surface of the photocatalyst into a stable form of a low molecular weight.

Purified gas in a clean room contains organic compounds that have been decomposed and hence cannot deposit on a wafer and a glass substrate. Even though a component in the purified gas deposits on a wafer, the component is hydrophilic. Therefore in either case, the contact angle does not increase. In other words, exposing a wafer and a glass substrate to the purified gas according to the present invention, does not increase the contact angle.

Since organic compounds comprise many constituents as mentioned above, it is practically not possible to analyze and estimate completely the composition thereof. Contamination of a substrate with organic compounds depends on the activity of each surface (e.g. film-forming species). In other words, contamination is different depending on the surface state of the substrate. A sensitive substrate is largely influenced by contaminants. According to the present invention, by taking non-methane organic compounds as an indicator, the non-methane organic compounds may be removed to a level preferably of not more than 0.2 ppm, more preferably of not more than 0.1 ppm.

Non-methane organic compounds are taken as an indicator because they can be easily measured by gas chromatography (GC). In contrast the constituents that can easily deposit on a substrate and consequently become troublesome in a clean room, such as siloxane and DOP (practically problematic matter) are present in an extremely low concentration of at most 1 ppb, and therefore the measurement and analysis thereof are complicated and laborious as well as are difficult to be monitored.

According to the present invention, when oxygen is present in a gas, ozone is generated upon irradiation of an ultraviolet ray and/or a radiation ray. The resultant ozone is preferably removed by any of well known ozone-decomposing materials, depending on fields of application. In the fabrication of a silicon substrate for example, the surface of the silicon substrate may be oxidized into silicon dioxide in the presence of ozone.

Ozone-decomposing materials which can be used are composite oxide catalysts including manganese dioxide catalysts, $MnO_2/TiO_2$—C, $MnO_2/ZrO$—C, as previously proposed by the present inventors (Laid Open Japanese Patent Application No. Hei-6-190236). Well-known active charcoals can be suitably used as well. Ozone-decomposing materials are described in the Laid Open Japanese Patent Application No. Hei-6-190236, the disclosure of which is incorporated herein by reference.

Ozone can be decomposed also in the presence of a photocatalyst used in the present invention, but it is preferred to use any of ozone-decomposing materials set forth above, in the case when the resultant ozone reaches a high concentration or when a tolerable ozone leakage is at only a low level.

Preferably, the method of the present invention comprises further a step of removing microparticles of the contaminant from a gas. Preferably, the apparatus of the present invention has a section for removing microparticles of the contaminant. More precisely, it is preferable to trap and remove microparticles of the contaminant with a filter or an adsorbent or by charging with photoelectrons. This removal step can eliminate mainly gaseous contaminants other than organic compounds, such as sulfur oxides (SOx), nitrogen oxides (NOx) and ammonia ($NH_3$) in the form of microparticles.

It is preferred according to the present invention that acidic and basic gases as well as microparticles are removed. Removal can be carried out by using one or more of a filter, an adsorbent and an ion exchanger and/or by electrically charging the contaminant with photoelectrons followed by trapping the charged contaminant. Organic compounds and organosilicon compounds that had been transformed into microparticles can also be removed by these removing means.

Filters which can be used include a HEPA filter, an ULPA (Ultra Low Penetration Air) filter, an electrostatic filter, an electret material, an ion exchange filter and the like. The ion exchange filter is preferred depending on fields of application, since it can trap a toxic gas, an odorous gas and the like which partly flows out without transformed into microparticles if present.

Adsorbents which can be used include active charcoal, silica gel, synthetic zeolite, molecular sieve and alumina. Alternatively, the adsorbents composed of a glass and a fluororesin that were previously proposed by the present inventors for trapping non-methane organic compounds can be suitably used (Laid Open Japanese Patent Application No. Hei-6-324). The disclosure about adsorbents described in the Laid Open Japanese Patent Application No. Hei-6-324 is herein incorporated by reference. According to the present invention, gaseous contaminants difficult to remove as such can be effectively removed by these adsorbents, since the contaminants are transformed into particles by means of an ultraviolet ray and/or a radiation ray.

In UV/photoelectron systems, microparticles are electrically charged with photoelectrons emitted from a photoelectron-emitting material and the resultant charged microparticles are trapped and removed. The UV/photoelectron systems previously proposed by the present inventors can be applied as desired. Methods for removing contaminants in the form of charged microparticles are described in the Japanese Patent Publications Nos. Hei-3-5859, Hei-6-34941, Hei-6-74909, Hei-6-74910, Hei-8-211, Hei-7-121369 and Hei-8-22398, all of which are herein incorporated by reference.

Any photoelectron-emitting material can be used, provided that it can emit photoelectrons upon UV irradiation. Those materials having a lower value of photoelectrically working function are preferred. In view of effects and economical efficiency, any of Ba, Sr, Ca, Y, Gd, La, Ce, Nd, Th, Pr, Be, Zr, Fe, Ni, Zn, Cu, Ag, Pt, Cd, Pb, Al, C, Mg, Au, In, Bi, Nb, Si, Ti, Ta, U, B, Bu, Sn and P as well as compounds, alloys and mixtures thereof can be preferably used alone or in combination of two or more of them. Physical composite materials such as amalgam can be used as well.

Suitable compounds include oxides, borides and carbides. Examples of oxides are $BaO/SrO$, $CaO$, $Y_2O_5$, $Gd_2O_3$, $Nd_2O_3$, $ThO_2$, $ZrO_2$, $Fe_2O_3$, $ZnO$, $CuO$, $Ag_2O$, $La_2O_3$, $PtO$, $PbO$, $Al_2O_3$, $MgO$, $In_2O_3$, $BiO$, $NbO$, $BeO$ and the like. Examples of borides are $YB_6$, $GdB_6$, $LaB_6$, $NdB_6$, $CeB_6$, $BuB_6$, $PrB_6$, $PrB_6$, $ZrB_2$ and the like. Examples of carbides are $UC$, $ZrC$, $TaC$, $TiC$, $NbC$, $WC$ and the like.

Alloys which can be used are brass, bronze, phosphor bronze, an alloy of Ag with Mg (2 to 20 wt % of Mg), an alloy of Cu with Be (1 to 10 wt % of Be) and an alloy of Ba with Al. Ag—Mg alloy, Cu—Be alloy and Ba—Al alloy as mentioned above are preferred. Oxides can be obtained also by heating only the surface of a metal in the air or by oxidizing it with a chemical agent.

Alternatively, an oxide layer having a good long-term stability may be formed on the surface of a metal alloy by heating the metal alloy prior to use. By way of an example, a surface oxide layer can be formed by heating a Mg—Ag alloy in steam at a temperature of 300° C. to 400° C. The obtained oxide thin layer exhibits a good long-term stability.

Photoelectron-emitting materials having a multi-layer construction as previously proposed by the present inventors can also be used. The disclosure about photoelectron-emitting materials described in the Laid Open Japanese Patent Application No. Hei-1-155857 is herein incorporated by reference. Alternatively, a photoelectron-emitting substance can be fabricated by forming a thin layer carried on a suitable matrix. For example, a thin layer of Au carried on a glass matrix may be used.

These materials can be used in any shape of a plate, a pleat, a curved surface, a net and the like. Shapes having a larger UV-exposed area and a larger air-contacting area are preferred.

Photoelectrons can be effectively emitted from a photoelectron-emitting material by suitably applying a reflective surface or a curved reflective surface, as previously proposed by the present inventors. The disclosure about photoelectron-emitting materials described in the Japanese Patent Publication No. Hei-6-34941 is herein incorporated by reference. Alternatively, an integral photoelectron-emitting device may be formed by coating an UV lamp with a photoelectron-emitting material as stated below. The disclosure about photoelectron-emitting devices described in the Laid Open Japanese Patent Application No. Hei-4-24354 is herein incorporated by reference. Shapes of photoelectron-emitting materials and those of reflective surfaces may be varied depending on shapes and constructions of a device or desired efficiency and can be determined as appropriate.

Any ultraviolet radiation may be used, provided that it can irradiate a photoelectron-emitting material so as to emit photoelectrons. A mercury lamp, a hydrogen discharge tube, a xenon discharge tube, a Lyman discharge tube, etc. are generally suitable. Those having a bactericidal (sterilizing) action at the same time are preferred depending on fields of application. Types of ultraviolet rays can be selected as appropriate depending on fields of application, operation details, purposes of use, economic efficiency and the like. In the biological field for example, the combined use of far infrared rays is preferred in view of bactericidal action and efficiency. A bactericidal lamp (main wavelength of 254 nm) is preferable, because the electrically charging action of the present invention is added with a bactericidal action. Any UV source can be used, provided that it can emit an ultraviolet radiation. The UV source can be selected as appropriate depending on fields of application, shapes and sizes of a device, effects and economical efficiency.

By irradiating the photoelectron-emitting material with an ultraviolet radiation in an electrical field, photoelectrons can efficiently supply microparticles with an electrical charge. Disclosures about electrical charging in an electrical field described in the Laid Open Japanese Patent Applications Nos. Sho-61-178050 and Sho-62-244459 as well as Laid Open Japanese Patent Application No. Hei-1-120563 are herein incorporated by reference. In the present invention, an electrical field may range from 0.1 V/cm to 5 kV/cm and the suitable intensity thereof can be determined as appropriate based on the results of preliminary experiments and examinations.

Since photoelectrons can electrically charge even extremely minute microparticles (e.g. those having a particle size of <0.1 μm) with a high efficiency, microparticles can be trapped and removed efficiently. Prior to electrical charging, microparticles may be made to grow to a larger particle diameter. A method for growing and charging microparticles electrically has been previously proposed by the present inventors (the Japanese Patent Application No. Hei-1-120564) and can be suitably used for electrically charging extremely minute microparticles as desired, depending on fields of application.

Any trapping material can be used, provided that it can trap the electrically charged microparticles. Dust-collecting plates (dust-collecting electrodes) and electrostatic filter systems are of general use, but an effective trapping material can also be constructed in such a way that the trapping section itself forms an electrode made of a woolen material such as steel wool or tungsten wool (woolen electrode material). Electret materials can be suitably used, too. An ion exchange filter (fiber) that has been previously proposed by the present inventors may be effective depending on fields of application. Ion exchange filters can trap coexistent gaseous contaminants and odorous gases that are difficult to be trapped by the present invention and hence the use of ion exchange filters is preferred depending on fields of application. These trapping materials may be used alone or in combination of two or more of them as appropriate, depending on fields of application, sizes and shapes of a device, economic efficiency and the like.

An ion exchange material refers to a support having the surface attached by an ion exchanger or an ion exchange group. Ion exchangers include cationic ion exchangers and anionic ion exchangers, a combination of both being preferred. Ion exchange groups include cationic ion exchange groups and anionic ion exchange groups, a combination of both being preferred.

Ion exchange materials are preferably ion exchange fibers having a support composed of a fiber. Fibers which can be used are natural fibers, synthetic fibers and the mixtures thereof.

Ion exchangers are now be described mainly with reference to ion exchange fibers. Ion exchangers may be supported on a fibrous support directly or on a support composed of a woven, knitted or filled fiber. Any form of fibers can be used, provided that ion exchangers supported on a fiber can be finally obtained.

Preferable methods for fabricating an ion exchange fiber suitable for use in the present invention are those that imply a graft polymerization, in particular radiation graft polymerization. This is because these methods can make use of starting materials having various properties and sizes.

Natural fibers which can be used include wool, silk etc. and synthetic fibers which can be used include hydrocarbon polymer-based fibers, fluorine-containing polymer-based fibers or polyvinyl alcohol, polyamide, polyester, polyacrilonitrile, cellulose, cellulose acetate, etc.

Hydrocarbon polymers which can be used include: aliphatic polymers such as polyethylene, polypropylene, polybutylene and polybutene; aromatic polymers such as polystyrene and poly-α-methylstyrene; cycloaliphatic polymers such as polyvinyl cyclohexane; or copolymers thereof. Fluorine-containing polymers which can be used include polyethylene tetrafluoride, polyvinylidene fluoride, ethylene-ethylene tetrafluoride copolymer, ethylene tetrafluoride-propylene hexafluoride copolymer, vinylidene fluoride-propylene hexafluoride copolymer and the like.

Any material can be used as a support, provided that it: has a large contact area with a gas stream; is shaped to have a diminished resistance; is readily to be grafted; has a good mechanical strength; is less likely to produce and fall waste fiber; and is less influenced by heat. A suitable support material can be selected depending on purposes of use, economical efficiency and effects, but generally a support is made of polyethylene, and most preferably made of polyethylene or a composite of polyethylene and polypropylene.

Various cationic ion exchangers and anionic ion exchangers can be used as an ion exchanger without particularly being limited. Examples which can be mentioned are cationic ion exchangers that contain a cationic ion exchange group such as a carboxyl, sulfonate, phosphate or phenolic group as well as anionic ion exchangers that contain a cationic ion exchange group such as any of primary to tertiary amino groups or a quaternary ammonium group or ion exchangers having both of the aforesaid cationic and anionic ion exchange groups.

More precisely, fibrous ion exchangers having a cationic or anionic ion exchange group can be obtained by graft polymerizing on the aforesaid fiber a styrene compound such as acrylic acid, methacryric acid, vinylbenzenesulfonic acid, styrene, halomethylstyrene, acyloxystyrene, hydroxystyrene or aminostyrene, or, vinyl pyridine, 2-methyl-5-vinylpyridine, 2-methyl-5-vinylimidazole or acryronitrile followed by reacting with sulfuric acid, chlorsulfonic acid or sulfonic acid as required. Optionally, these monomers may be grafted on a fiber in the presence of a monomer having two or more double bonds such as divinyl benzene, trivinyl benzene, butadiene, ethylene glycol, divinyl ether, ethylene glycol dimethacrylate and the like.

Ion exchange fibers can be fabricated in the manner as described above. Ion exchange fibers have a diameter of 1 to 1,000 $\mu$m, preferably 5 to 200 $\mu$m and the diameter can be appropriately selected depending on types and uses of a fiber.

The way of using cationic ion exchange groups and anionic ion exchange groups in these ion exchange fibers can be determined depending on the kinds and the concentrations of the components to be removed in a gas to be purified. By analyzing the gas previously and estimating the components to be removed, adequate types and amounts of ion exchange fibers can be selected. More precisely, when an alkaline gas is to be removed, fibers having cationic ion exchange groups (cation exchangers) are suitable, whereas, when an acidic gas is to be removed, fibers having anionic ion exchange groups (anion exchangers) are suitable. And, when both an alkaline and acidic gases are to be removed, both of anionic ion exchange groups and cationic ion exchange groups may be used.

An effective way of flowing a gas through an ion exchange fiber is to generate a gas stream perpendicular to a filter made of the ion exchange fiber.

The flow rate of a gas passing through an ion exchange fiber can be suitably determined by conducting preliminary experiments. Since having a high removal rate, this fiber can be used generally at a SV of the order of 1,000 to 100,000 ($h^{-1}$). Ion exchange fibers that are produced by a radiation graft polymerization, as previously proposed by the present inventors, can be suitably used with a particularly high efficiency (Japanese Patent Publications Nos. Hei-5-9123, Hei-5-67325, Hei-5-43422 and Hei-6-24626).

Ion exchange fibers are effective in trapping of ionic matter (constituents) and hence can efficiently trap and remove the ionic matter intended by the present invention.

In particular, ion exchange filters (fibers) that are fabricated by radiation graft polymerization are practicably effective, since the radiation can reach deep in a support uniformly and the ion exchanger (anion and/or cationic exchanger) can firmly attach over a large area thereof (at a high density) so that the exchange volume is made larger and hence ionic matter in a low concentration can be removed at a high rate and with high efficiency.

Fabrication process using a radiation graft polymerization is advantageous in that: the polymerization can be conducted on a support having the shape near to that of finished product; it can be conducted at room temperature; it can be conducted in vapor phase; it can realize a larger grafting ratio; and it can give an adsorption filter having a low impurity content.

As the result, following characteristics can be obtained:
(1) Ion exchange fibers made by radiation graft polymerization can exhibit a higher adsorption rate and a larger adsorption amount, since an ion exchanger (adsorptive part) is added thereto more uniformly and more abundantly (a higher addition density).

(2) Pressure loss can be diminished.

A means for trapping and removing microparticles may be used alone or in combination of two or more, which can be suitably selected on the basis of preliminary experiments, depending on the properties of the produced microparticles.

Schemes for producing microparticles (irradiation source, way of producing microparticles, conditions and the like) and for trapping and removing microparticles (trapping means, conditions and the like) can be suitably selected on the basis of preliminary experiments, depending on various factors including application field, gas type, apparatus design, production scale, performance requirement, economical efficiency and the like.

The method of the present invention for removing microparticles of contaminants can be carried out according to any of the 6 schemes shown below by way of examples.

(1) A→B→C (2) A→B→A→C (3) A→C→A→B (4) A→C→B (5) A→B+C (6) A+B→C

In the schemes above:

the member A represents a step for irradiating a gas with an ultraviolet ray and/or a radiation ray; or a microparticle-producing section having a source of an ultraviolet ray and/or a radiation ray;

the member B represents a step for contacting the microparticles of contaminants with a photocatalyst and for irradiating the photocatalyst being kept in contact with the microparticles; or a decomposition section having a photocatalyst and a light source for irradiating the photocatalyst;

the member C represents a step for clearing the gas of the microparticles of contaminants; or a removal section for removing the microparticles of contaminants;

the member C isn't essential to the present invention; the symbol → indicates a temporal sequence of the steps; or a spatial sequence of the sections downstream; and the symbol + indicates concurrence of 2 steps; or integration of 2 sections.

Suitable schemes can be selected on the basis of preliminary experiments and examinations, depending on fields of application, types of apparatus, states of the gas to be treated, required removal performances, economical efficiency and the like.

Generally speaking, (a) when an apparatus is of a large size, the schemes are preferred in the order of (2), (3)>(1), (4)>(5), (b) when organic compounds are present in a concentration higher than that of other gaseous contaminants, (1) or (2) is preferred, (c) when a gas contains a high concentration of constituents having a possibility of becoming a catalytic poison to photocatalysts during a long-term operation, such as sulfur-containing compounds, (3) or (4) is preferred, (d) when a high removal performance is required, (2) or (3) is preferred: and (e) when an apparatus is of a small size, (5) or (6) is preferred.

The member C may precede the members A and B. This order is preferred because acidic gases having a possibility of adversely influencing on photocatalysts can be preliminarily eliminated. Such acidic gases include $SO_2$, NO, HCl and HF. Moreover, when sulfur-containing compounds, such as sulfur oxides, hydrogen sulfide, thiophene and thiols are present in a high concentration, the compounds might act on photocatalysts as catalytic poison.

EXAMPLES

The present invention will now be described in more detail by way of examples, which should not be construed as limiting the scope of the present invention.

Example 1

FIG. 1 represents an embodiment of the apparatus of the present invention applied to purify air for feeding an air knife in a semiconductor production factory. A purification apparatus 12 of the present invention is placed in a clean room 1 of class 1,000.

First, a device for feeding air 14 into the clean room 1 is described. An air inlet pipe 2 is connected to a pre-filter 3 for filtering off coarse solid particles present in the outside air. The pre-filter 3 and an air outlet 4 of the clean room 1 are connected to a fan 5 for feeding air into the clean room 1. The fan 5 is connected to an air-conditioner 6 for controlling the temperature and the humidity of the air. The pipe leaving the air-conditioner is divided into several branches, each branch being connected to a HEPA filter 7 for removing solid microparticles. The HEPA filter 7 is provided at the interface with the internal space of the clean room 1, and preferably at the ceiling of the clean room. The air outlet 4 is provided at the bottom of the clean room 1.

The outside air 2 to be fed into the clean room 1 is treated first with the coarse filter 3 and the air-conditioner 6. The air is then freed from dust with the HEPA filter 7 before entering into the clean room 1, to become air 14 of class 1,000 containing an extremely low concentration of organic compounds 30. In other words, the organic compounds of an extremely low concentration originating in organic materials (polymer materials) including cars and plastics can be removed with neither coarse filter 3, nor air-conditioner 6, nor HEPA filter 7, and hence are brought to enter into the clean room 1. On the other hand, the structural components of the clean room 1 are evolving organic compounds in the clean room 1. In consequence, the air in the clean room 1 has a concentration of organic compounds higher than that of the outside air. The air 14 in the clean room 1 has a concentration of organic compounds of 0.8 to 1.2 ppm in terms of non-methane hydrocarbons taken as an example.

Preferably, the purification apparatus 12 of the present invention is horizontally disposed. As the result, the air 14 can flow horizontally through the apparatus 12. Preferably, an air knife device 29 is provided with an air inlet in the direction of exhaust air discharged from an air outlet of the purification apparatus 12. And preferably, the air outlet 4 of the clean room 1 is provided in the direction of exhaust air discharged from the air outlet of the air knife 29.

As shown in FIG. 1, the air 14 is fed through the HEPA filter 7 into the clean room 1 downwardly from the top thereof. Then, while passing through the purification apparatus 12 horizontally, the air 14 is freed from dust and is purified to become clean air 28 in which organic compounds had been decomposed. The resultant clean air 28 is fed into the air knife 29 for cleaning a wafer. Exhaust air of the air knife 29 is drawn out of the air outlet 4 provided at the lower part of the clean room.

As shown in FIG. 1, the purification apparatus 12 is provided successively with a coarse filter 25a for dust-removing, a microparticle-producing section 8, a decomposition section 26, a coarse filter 25b and an ozone-decomposing section 27.

Preferably, the purification apparatus 12 has the coarse filter 25a. Dust that is eventually present in the clean room 1 tends to contaminate and deteriorate a photocatalyst 32. The coarse filter 25a are useful for removing such dust.

The microparticle-producing section 8 consists of a housing and an UV lamp 15 received therein. The UV lamp is a low-pressure mercury lamp 15, for example.

Organic compounds 30 in the air 14 have a possibility of increasing the contact angle by depositing onto a substrate such as a wafer. But, when irradiating the air 14 with the UV radiation emitted by the UV lamp 15, these organic compounds 30 can be transformed into particulate matter 16. Upon exposure to the UV radiation, gaseous oxygen present in the air also is transformed into gaseous ozone.

The decomposition section 26 consists of an UV lamp 31 and a pair of photocatalysts 32 placed opposite each other on the either side of the UV lamp in the air-flowing direction. The photocatalyst 32 shown in FIG. 1 is composed of a honeycomb structure provided with the partitions defining two or more through-holes and a catalytically active component in the form of particles. The catalytically active component is made of titanium dioxide in the form of particles that are coated on the surface of the partitions of the honeycomb structure. Preferably, the honeycomb structure has the length in the direction parallel to the partitions shorter than that in the radial direction. This is to avoid the interception of UV radiation by the partitions.

The air which contains organic compounds passes through the through-holes of the honeycomb structure and are introduced into the decomposition section 26. While the air 14 is passing through the holes of the honeycomb structure of the photocatalyst 32, particulate matter 16 contained in the air 14 is brought into contact with the catalytically active components in the form of particles present on the surface of the through-holes of the honeycomb structure. Since the photocatalyst 32 is activated by irradiation with the UV lamp 31, particulate matter is decomposed under catalytic action. Ultimately, organic compounds are reduced to a level of not more than 0.2 ppm, preferably 0.1 ppm in terms of non-methane organic compounds taken as an indicator. Organic compounds having a high molecular weight or active organic compounds that are likely to increase the contact angle on a wafer are decomposed into organic compounds of a low molecular weight that aren't likely to increase the contact angle, or carbon dioxide and water.

The dust-removing filter 25b consists of an ULPA filter, for example. The air of class 1,000 in the clean room 1 can be cleared of microparticles with the ULPA filter to become class 10 or less. The dust-removing filter 25b can also efficiently trap microparticles escaped at or near the microparticle-producing section 8 in case of emergency. Preferably, the ozone-decomposing material 27 has a honeycomb shape provided with the partitions defining at least 2 through-holes. Ozone that was generated upon irradiation with the UV lamp 15 can be decomposed to a level of not more than 0.01 ppm by means of the photocatalyst 32 and the ozone-decomposing material 27. Since generation of ozone cannot be ignored in semiconductor production factories, ozone is decomposed to a level equal to or less than that in natural air through the two-step decomposition.

Example 2

Example 2 is described with reference to FIG. 2.

Figure 2:
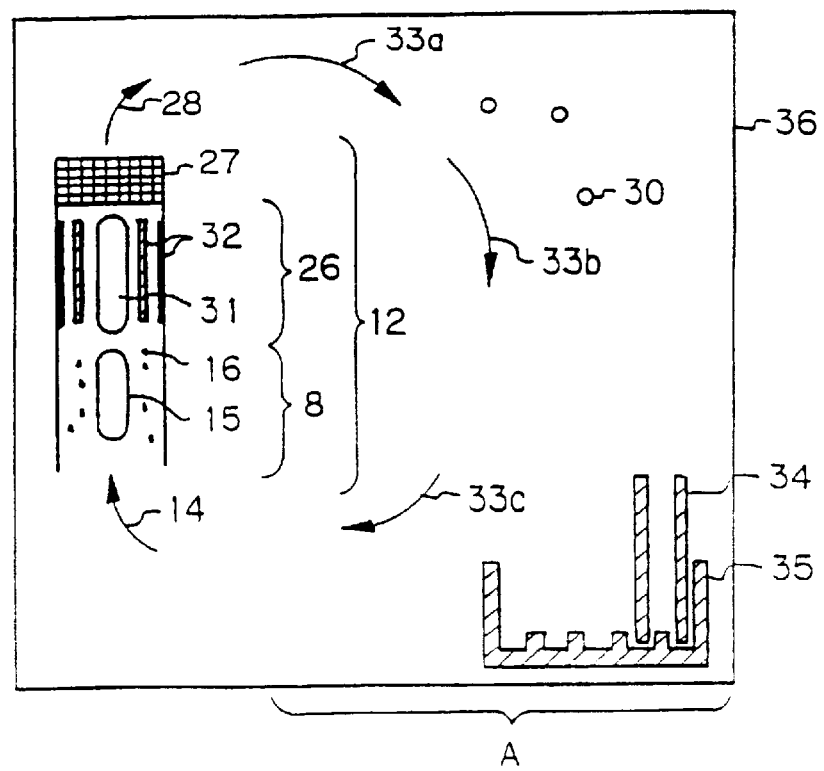
FIG. 2 is a general view of a wafer stocker having a purification apparatus of the present invention disposed therein.

As shown in FIG. 2, a wafer stocker 36 for storing wafers is disposed in the clean room 1 of class 1,000 and a purification apparatus 12 is disposed in the stocker 36. The purification apparatus 12 comprises a microparticle-producing section 8 for transforming organic compounds into microparticles by UV irradiation, a decomposition section 26 for decomposing the resultant microparticles of organic compounds by the action of a photocatalyst and an ozone-decomposing section 27. The air 14 in the stocker 36 containing organic compounds 30 is treated with the purification apparatus 12 of the present invention to become clean air 28. Organic compounds in this air 28 are decomposed to a level of not more than 0.01 ppm, at which level the organic compounds can avoid increasing the contact angle on the surface of a wafer.

This example will be described in more detail below.

The air 14 in the stocker 36 is first irradiated with an UV lamp 15 (low-pressure mercury lamp) so that organic compounds 30 contained therein are transformed into particulate matter 16. This particulate matter 16 are made to deposit onto the surfaces of the photocatalyst 32 (carried on and fixed to the surrounding wall surfaces and the glass rods) which had been irradiated with an UV lamp 31 (bactericidal lamp). The deposited particulate matter is decomposed and removed through photocatalysis to afford a clean air 28.

As shown in FIG. 2, the photocatalyst 32 is composed of at least 2 glass rods and titanium oxide in the form of particles applied onto the surface of each glass rod. This photocatalyst is hanging. The photocatalyst is further applied on the wall surfaces. More particularly, titanium oxide in the form of particles dispersed in a suitable solvent are applied on the wall surfaces.

By opening the wafer stocker 36, the air of class 1,000 in the clean room enters into the wafer stocker 36. This air contains organic compounds in a concentration of 0.8 to 1.5 ppm in terms of non-methane organic compounds. The air in the form of air streams 33a, 33b and 33c containing these organic compounds are made to contact with the photocatalyst 32, and consequently microparticles of organic compounds having a high molecular weight or those of active organic compounds can be effectively decomposed into carbon dioxide and water. Organic compounds are decomposed to a level below 0.1 ppm in terms of non-methane organic compounds taken as an indicator.

Irradiation with the UV lamps 15, 31 makes the temperature elevate and gives rise to air convection. As a result of this air convection, air-flows upwardly from the bottom towards the top of the apparatus 12, and outside of the apparatus, air streams 33a, 33b and 33c are generated.

Since the air stream inside the apparatus 12 gives rise to Brownian movement on a molecular level, contaminants are brought into collision with the glass rods or the wall surfaces and hence microparticles of organic compounds are made into contact with the photocatalyst. Since contaminants are easy to deposit onto a wafer, contaminants can deposit also onto the photocatalyst.

In the manner as described above, the part for storing the wafers 34 set in a wafer case 35 is effectively cleaned.

Ozone generated upon irradiation with the UV lamp 15 for producing particles can be decomposed and removed to a level of not more than 0.01 ppm by the action of the photocatalyst 32 and an ozone-decomposing material 27 of a honeycomb shape.

In FIG. 2, reference numerals identical to those in FIG. 1 denote the same elements as those in FIG. 1.

Though the cases when a gas is composed of air are described in the examples 1 and 2, the present invention can of course be applied as well to the cases in which gas is another gas such as nitrogen or argon that contains gaseous contaminants such as organic compounds as impurities. The present invention can be applied not only under atmospheric pressure, but also under an increased or decreased pressure.

Example 3

Figure 3:
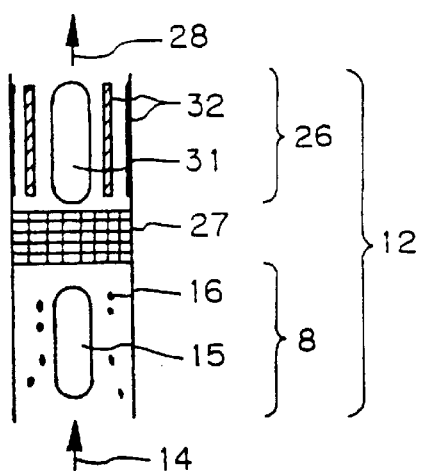
FIG. 3 is a cross-sectional view showing another embodiment of the purification apparatus of the present invention.

FIG. 3 shows a purification apparatus 12 of a type different from that shown in FIG. 2. As shown in FIG. 3, the order of the ozone-decomposing material 27 and the decomposition section 26 provided with the photocatalyst are reversed so that the ozone-decomposing material 27 is situated next to the particle-producing section 8. The apparatus thus arranged has the effects comparable to those of the apparatus shown in FIG. 2.

Example 4

A sample of gas as specified below was charged into a stocker arranged as shown in FIG. 2, a wafer was placed therein, and then the contact angle on the wafer, the concentrations of non-methane organic compounds and ozone present in the stocker were measured.

Experimental Conditions (1) sample gas: air of class 10 in a semiconductor production factory containing non-methane organic compound in a concentration of 0.8 to 1.2 ppm;

(2) stocker volume: 30 liters;

(3) UV lamp for producing particles: low pressure mercury lamp (184 nm);

(4) photocatalyst: titanium dioxide carried on a glass fiber matrix by sol-gel process;

(5) light source: bactericidal lamp (254 nm) (for irradiating a photocatalyst);

(6) ozone-decomposing material: composite oxide catalyst, $MnO_2/ZrO$—C.

More precisely, the ozone-decomposing material is composed of a honeycomb structure provided with the partitions defining at least 2 through-holes and a manganese oxide coated on the surfaces of the partitions of the honeycomb structure. The honeycomb structure is substantially composed of a zirconium oxide and carbon atoms. At least a portion of carbon atoms may be present in the form of zirconium carbide. Manganese oxide has the shape of a particle, for example. These particles are not always required to cover all the surfaces of the partitions of the honeycomb structure.

(7) wafer: a highly pure silicon wafer of 5-inch diameter was cut into pieces of 1 cm×8 cm and placed in the stocker;

(8) pretreatment of the wafer: washing with a detergent and alcohol on a clean bench in the clean room, followed by $UV/O_3$ cleaning;

(9) measurement of the contact angle: the contact angle was measured with a CA-D type contact angle feeler manufactured by Kyowa Kaimen Kagaku, Inc.;

(10) concentration of non-methane organic compounds: was measured by gas chromatography (GC) method;

(11) ozone concentration: was measured with a chemiluminescent ozone densitometer;

(12) opening of the stocker: the stocker was disposed in a clean zone (class 10) of a semiconductor production factory and open-close cycles were repeated 6 times per day.

Figure 4:
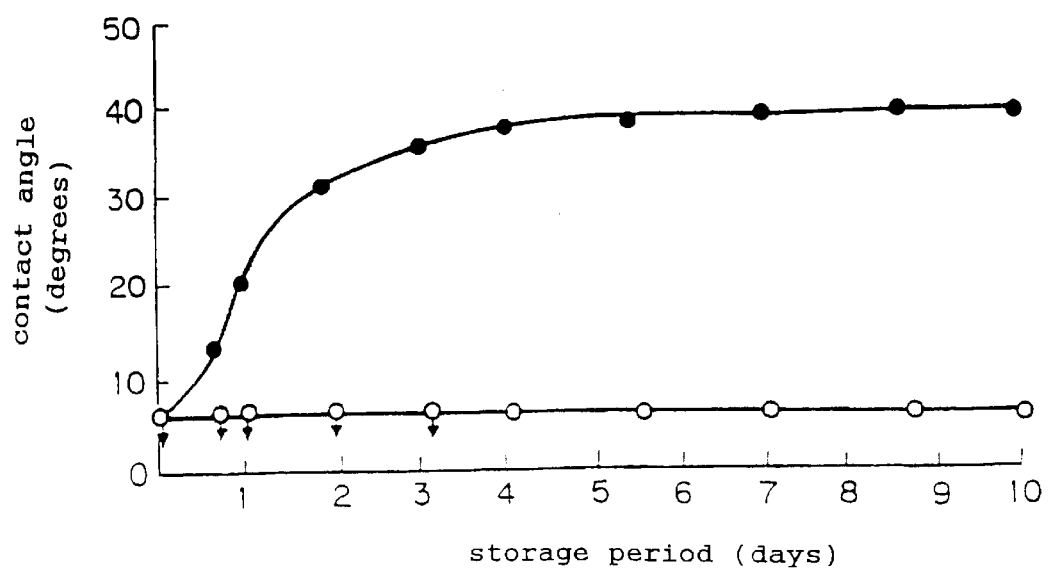
FIG. 4 is a graph of the contact angle (degrees) versus storage period (days) showing the results of Example 4.

Results (1) FIG. 4 shows the contact angle on a wafer as the function of the number of days during which the wafer was stored in a stocker.

In FIG. 4, the symbol ○ represents the values obtained according to the present invention and the symbol ● represents the values obtained from a (comparative) test in which the wafer was exposed to the air of class 10 in a clean room. The symbol ↓ means that the obtained value is below the limit of detection.

(2) Concentrations of non-methane organic compounds and ozone present in the stocker are shown in the Table 1.

TABLE 1

| storing period (days) | organic compound concentration(ppm) | ozone concentration |
|---|---|---|
| 1 | <0.1 ppm | <0.01 ppm |
| 2 | <0.1 ppm | <0.01 ppm |
| 10 | <0.1 ppm | <0.01 ppm |

Switching the UV lamp for producing particles generates a ozone concentration of 15 to 20 ppm.

(3) In a stocker without the unit of the present invention, a wafer was stored for 2 and 7 days. Then, the wafer was taken out of the stocker, heated to desorb the organic compounds deposited thereon. Analysis of the wafer by gas chromatography/mass spectrometry (GC/MS) showed the presence of phthalic esters such as DOP. The unit of the present invention was disposed in the stocker and a wafer was treated and analyzed in the same way. Phthalic esters such as DOP was undetectable.

Example 5

Figure 5:
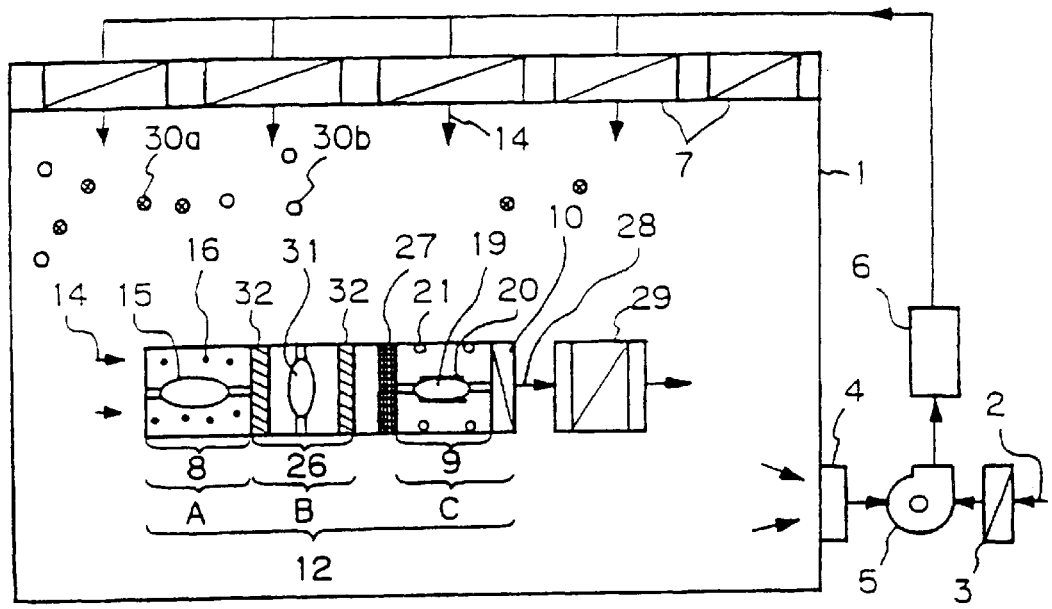
FIG. 5 is a general view of a clean room having a purification apparatus of the present invention disposed therein.

FIG. 5 shows an embodiment of the apparatus of the present invention applied in a semiconductor production factory to purify air for feeding an air knife. The purification apparatus 12 shown in FIG. 5 is different from that shown in FIG. 1 in having further a section C for removing particulate matter.

As shown in FIG. 5, reference numeral 1 represents a clean room of class 100. The air 14 in the clean room 1 is treated with the purification apparatus 12 of the present invention comprises a section 8(A) for producing microparticles of organic compounds and coexistent gaseous contaminants such as $SO_2$ by UV irradiation, a section 26(B) for decomposing the microparticles of organic compounds with a photocatalyst, an ozone-decomposing section 27 and the sections 9, 10(C) for trapping the microparticles of particulate matter with photoelectrons. The air 14 having passed through the purification apparatus 12 of the present invention results in the clean air 28 which is free from dust as well as organic compounds and coexistent gaseous contaminants. The clean air 28 is fed to an air knife device 29 for cleaning a wafer (substrate).

This embodiment is, as described above, arranged according to the following scheme and includes a section for producing microparticles by UV irradiation (A)→decomposition section for decomposing microparticles of organic compounds with a photocatalyst (B)→removal (dust-removal) section for trapping and removing particulate matter in the form of microparticles (C).

This embodiment is described hereinafter in more detail.

The outside air 2 is treated first with a coarse filter 3 and an air-conditioner 6 before entering into the clean room 1. Then, the air is cleared of dust with a HEPA filter 7 at the inlet of the clean room to become air 14 having a microparticle concentration of class 100. In the air 14, there exist organic compounds 30a together with gaseous contaminants 30b which are composed of acidic gases including SOx, NOx, HCl, HF, etc. and basic gases including $NH_3$, amines, etc. Acidic and basic gases contained in the outside air 2 are carried into the clean room 1 in company with the outside air 2. Only a little amount of acidic and basic gases generate in the clean room 1. The air 14 in the clean room has an organic compound concentration of 0.8 to 1.2 ppm in terms of non-methane organic compounds.

In the air 14 in the clean room 1, organic compounds 30a as well as acidic and basic gases 30b are transformed into particulate matter 16 upon irradiation of the UV lamp (low-pressure mercury lamp) 15 (A).

Among the particulate matter 16, particles that are derived from organic compounds 30a and basic gas tend to deposit onto the surface of the photocatalyst ($TiO_2$), and hence can deposit on the surface of the photocatalyst 32 activated by irradiation with the UV lamp 31 so as to be decomposed and removed through photocatalysis (B).

On the other hand, among the particulate matter 16, particles derived from acidic gas are difficult to decompose with the photocatalyst 32, and consequently pass through the photocatalytically decomposing section B into the section (C) for trapping and removing with the aid of photoelectrons. The section (C) is composed of an UV lamp 19, a photoelectron emitting material 20, an electrode (part 9 for supplying particulate matter with an electrical charge) and a material 10 for trapping the electrically charged particulate matters 16.

In the trapping and removing section (C), influent particulate matter 16 are electrically charged with photoelectrons (not shown) that are emitted from the photoelectron emitting material 20, and the electrically charged particulate matter is trapped and removed with the material 10. Photoelectrons can be efficiently emitted by covering the UV lamp 19 with the photoelectron emitting material 20 and forming an electrical field of 50 V/cm between the material 20 and the electrode 21.

In this embodiment, air contaminated with organic compounds is introduced into the decomposing section 26 (B) which is composed of a photocatalyst 32 (formed by coating titanium oxide on the surface of the partitions of a honeycomb-shaped ceramic matrix) and an UV lamp (bactericidal lamp) 31. In this section, organic compounds are decomposed to a level of not more than 0.2 ppm, preferably 0.1 ppm in terms of non-methane organic compounds taken as an indicator.

More precisely, organic compounds of a high molecular weight or active organic compounds that are responsible for an increase in the contact angle are decomposed into organic compounds of a low molecular weight that avoid any increase in the contact angle, or into carbon dioxide and water.

The resultant air has a concentration of acidic and basic gases by an amount tenfold lower than that of the air 14 in the clean room. In terms of $SO_2$ taken as an indicator, an average $SO_2$ concentration which had been 0.001 ppm (10 ppb) in the clean room 1 can be decreased to 1 ppb or less.

In a manner as described above, microparticles present in the air 14 of class 100 in the clean room are, together with particulate matter 16 originating from gaseous contaminants, are electrically charged and trapped at the removal section (C) for removing contaminants with photoelectrons. By virtue of the apparatus of the present invention 12, the air 28 becomes an extremely clean air which is superior to air of class 1 and are free from organic compounds and coexistent gaseous contaminants.

Ozone that is generated by irradiation of the UV lamp 15 for producing particles can be decomposed to a level of not more than 0.01 ppm by means of the photocatalyst 32 and a honeycomb-shaped ozone-decomposing material 27.

In other words, since effluent ozone should not be ignored in semiconductor production factories, the ozone is decomposed to a level equal to or less than that in natural air through the two-step decomposition.

In FIG. 5, reference numeral 4 denotes an air outlet of the clean room 1 and reference numeral 5 denotes a fan.

Example 6

Figure 6:
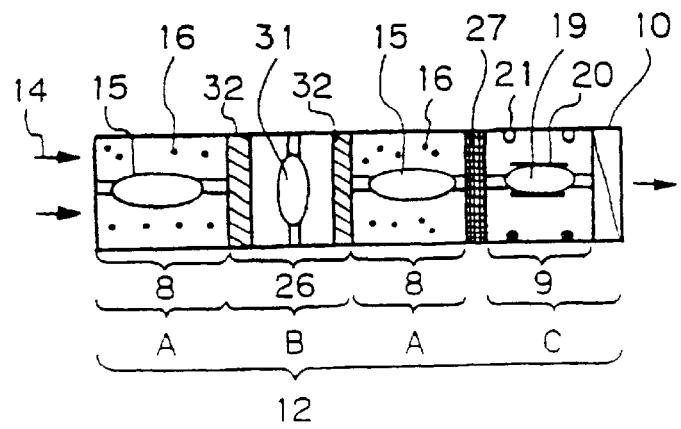
FIG. 6 is a cross-sectional view showing another embodiment of the purification apparatus of the present invention.

FIG. 6 represents an another embodiment in which the apparatus of the present invention is applied to purify air for feeding an air knife in a clean room 1 of class 100 of the same type as that in Example 5.

As shown in FIG. 6, the apparatus of this example is different from that of Example 5 (FIG. 5) in that decomposition section (B) for decomposing the microparticles of organic compounds with a photocatalyst is followed by another microparticle-producing section (A) using UV irradiation.

In other words, the apparatus of this example is arranged in accordance with the scheme of A→B→A→C.

Owing to this arrangement, the apparatus of this example can subject acidic gas to microparticle-producing step twice, thus facilitating the removal thereof in the trapping section. The air 14 in the clean room is freed of gaseous contaminants more efficiently than in Example 1. Gaseous contaminants are decreased to one fiftieth or less of the concentration at the inlet.

In FIG. 6, reference numerals identical to those in FIG. 5 denote the same elements as those in FIG. 5.

Example 7

Figure 7:
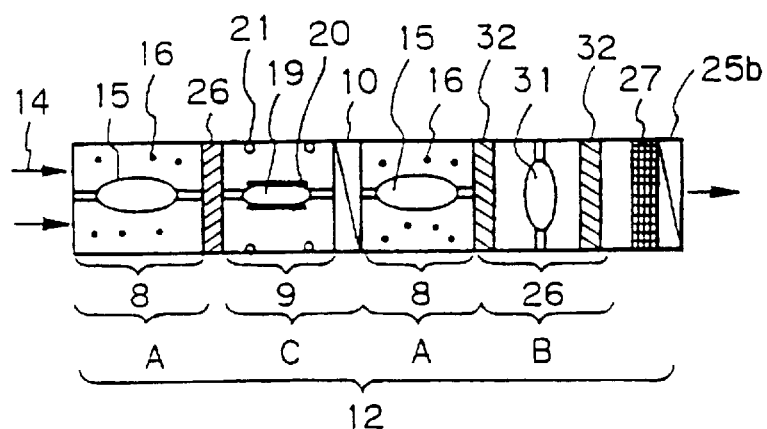
FIG. 7 is a cross-sectional view showing another embodiment of the purification apparatus of the present invention.

FIG. 7 represents another embodiment in which the apparatus of the present invention is applied to purify air for feeding an air knife in a clean room 1 of class 100 of the same type as that in Example 5.

As shown in FIG. 7, the apparatus is arranged in accordance with the scheme of A→C→A→B. This type of apparatus is effective for treating air having a high concentration of acidic or basic gases, hence suitable for use in acid washing or alkali treating operation in a clean room.

As shown in FIG. 7, gaseous contaminants are transformed into microparticles (A), and then the resultant microparticles of particulate matter is trapped and removed (C), thus enabling to decrease the concentrations of acidic and basic gases.

Then, gaseous contaminants such as organic compounds are transformed into microparticles again (A), and then the resultant microparticles originating in organic compounds and basic gas are decomposed with a photocatalyst (B). Reference numeral 25b denotes a HEPA filter which can act in case of emergency for collecting an eventually present microparticles (particulate matter) in the upper stream.

Since acidic or basic gases at high concentration can be trapped and removed prior to reaching the photocatalytically decomposing section (B), possible sources (e.g. acidic gas) of a catalytic poison to the photocatalyst 32 can be removed, thus allowing for a long-term stable operation.

By virtue of the apparatus of the present invention, organic compounds are decomposed to a level of not more than 0.1 ppm in terms of non-methane organic compounds taken as an indicator. Operations as stated above makes gaseous contaminants increase to a level of 100 to 500 ppb in terms of $SO_2$ concentration, which can be removed to a level of not more than 1 ppb owing to the apparatus of the present invention.

In FIG. 7, reference numerals identical to those in FIG. 5 denote the same elements as those in FIG. 5.

Example 8

Figure 8:
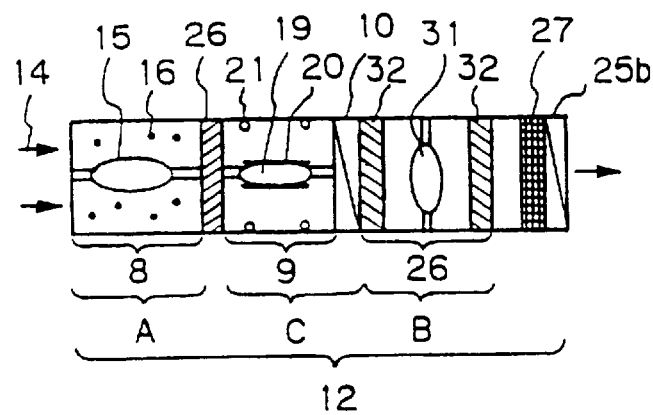
FIG. 8 is a cross-sectional view showing another embodiment of the purification apparatus of the present invention.

FIG. 8 represents another embodiment in which the apparatus of the present invention is applied to purify air for feeding an air knife in a clean room 1 of class 100 of the same type as that in Example 5.

As shown in FIG. 8, the apparatus is arranged in accordance with the scheme of A→C→B. This type of apparatus is effective for treating air having a high concentration of acidic or basic gases.

As shown in FIG. 8, gaseous contaminants are transformed into microparticles (A), and then the resultant microparticles of particulate matter is trapped and removed (C), thereby enabling to decrease the concentrations of acidic and basic gases.

Then, microparticulate matter originating in organic compounds and basic gas are decomposed with a photocatalyst (B). Reference numeral 25b denotes a HEPA filter which can act in case of emergency for collecting an eventually present microparticles (particulate matter) in the upper stream.

Since acidic or basic gases at high concentration can be trapped and removed prior to reaching the photocatalytically decomposing section (B), possible sources (e.g. acidic gas) of a catalytic poison to the photocatalyst 32 can be removed, thus allowing for a long-term stable operation.

By virtue of the apparatus of the present invention, organic compounds are decomposed to a level of not more than 0.1 ppm in terms of non-methane organic compounds taken as an indicator. Operations as stated above makes gaseous contaminants increase to a level of 100 to 500 ppb in terms of $SO_2$ concentration, which can be decreased to reach a level of not more than 1 ppb owing to the apparatus of the present invention.

In FIG. 8, reference numerals identical to those in FIG. 5 denote the same element as those in FIG. 5.

Example 9

Figure 9:
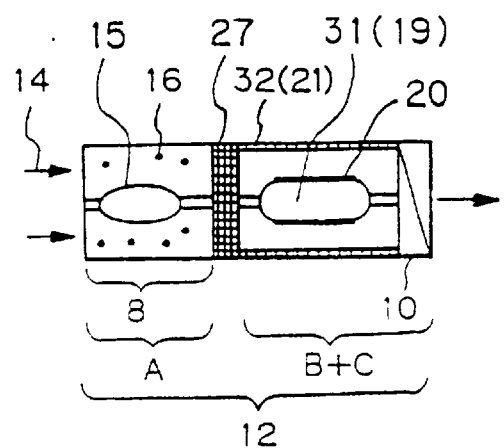
FIG. 9 is a cross-sectional view showing another embodiment of the purification apparatus of the present invention.

FIG. 9 represents another embodiment in which the apparatus of the present invention is applied to purify air for feeding an air knife in a clean room 1 of class 100 of the same type as that in Example 5.

As shown in FIG. 9, the apparatus 12 of the present invention of Example 5 is modified in such a way that an integral section (B+C) is formed by integrating the decomposition section (B) for photocatalytically decomposing the microparticles of organic compounds and basic gas with the removal section (C) for trapping and removing acidic and basic gases with photoelectrons.

In other words, the apparatus is arranged in accordance with the scheme of A→B+C.

The air 14 in the clean room 1 is irradiated with an UV lamp (low-pressure mercury lamp) 15 so as to transform organic compounds 30a as well as acidic and basic gases 30b into particulate matter 16 (A).

An integral section composed of the photocatalytical decomposition section (B) and the trapping section (C) for trapping microparticles of particulate matter comprises an UV lamp 31 (19), a photoelectron-emitting material 20 coated on the surface of the UV lamp 31 (19), an electrode 21, a photocatalyst 32 coated on the surface of the electrode 21 and a trapping material 10 which is placed downstream to the UV lamp 31 for trapping charged particulate matter. The UV lamp 31 (19) is a bactericidal lamp and has a dual function of irradiating the photoelectron-emitting material 20 (for emission of photoelectrons) and the photocatalyst 32 (for induction of photocatalysis). The photoelectron-emitting material 20 is coated over the UV lamp 31 (19). By forming an electrical field of 50 V/cm between the photoelectron-emitting material 20 and the electrode 21, photoelectrons can be efficiently emitted towards the electrode 21. Among the particulate matter 16, particles originating in the acidic and basic gases 30b can be electrically charged with the photoelectrons emitted from the photoelectron-emitting material 20. The resultant charged particulate matter is trapped and removed with the trapping material 10 for trapping the charged particulate matter.

Among the particulate matter 16, microparticles originating in organic compounds 30a and basic gas can deposit on the surface of the photocatalyst 32 which had been activated by irradiation of the UV lamp 31, and subsequently they can be decomposed and removed through photocatalysis (B).

In a method for removing microparticles in an electrical field that comprises: irradiating a photoelectron-emitting material with ultraviolet radiation so as to induce the emission of photoelectrons; supplying microparticles with an electrical charge by the photoelectrons; and trapping the charged microparticles while forcing them to move by the action of the electrical field, the effects of the photocatalyst can be further improved by incorporating the photocatalyst into an electrode that forms the electrical field (Japanese Patent Application No. Hei-8-231290).

Example 10

Purification of the air in a wafer stocker (wafer receiving stocker) 36 in a clean room of class 100 in a semiconductor production factory is described with reference to a basic arrangement shown in FIG. 10.

Organic compounds 30a and coexistent acidic and basic gases 30b including $SO_2$ and $NH_3$ contained in the air present in the stocker 36 are treated by a purification unit 12 of the present invention disposed in the stocker 36. The purification unit 12 comprises a microparticle-producing section 8 (A) for producing microparticles of organic compounds and coexistent gaseous contaminants by UV irradiation, a decomposition section 26 (B) for decomposing the microparticles of organic compounds with a photocatalyst, an ozone-decomposing section 27 and a trapping section (C) composed of sections 9, 10 for trapping the microparticles of particulate matter with photoelectrons.

The air 14 in the stocker 36 containing organic compounds 30a as well as coexistent gases 30b including acidic gas such as $SO_2$ and basic gas such as $NH_3$ are treated in the unit 12 of the present invention to become clean air 28. This air 28 is extremely clean and is superior to class 1 and has a concentration of organic compounds below 0.01 ppm and concentrations of acidic and basic gas respectively of below 1 ppm.

By placing the wafers 34 held on a wafer case 35 into the wafer stocker 36 of this embodiment and exposing the wafers to the extremely clean air as mentioned above, the wafers can be maintained without the increase in the contact angle (no increase in the contact angle occurs on the wafer 34 received in the part D of the wafer stocker 36) and the change of the electrical properties.

This embodiment is arranged in accordance with the scheme below:

microparticle-producing section by UV irradiation (A)→decomposition section for decomposing the microparticles of organic compounds with a photocatalyst (B)→removal (dust-removal) section for trapping the microparticles of particulate matter (C).

This embodiment is described in more detail.

By opening the stocker 36 disposed in the clean room 1, the air 14 of class 100 in the clean room 1 flows into the stocker 36. This air 14 is contaminated with organic compounds in a concentration of 0.8 to 1.5 ppm in terms of non-methane hydrocarbons as well as with acidic gas such as $SO_2$ and basic gas such as $NH_3$. $SO_2$ is present in a concentration of 10 to 15 ppb and $NH_3$ is present in a concentration of 30 to 50 ppb.

When organic compounds 30a in air in the wafer stocker 36 are deposited onto a substrate such as a wafer, the organic compounds 30a increase the contact angle. When acidic and basic gases 30b in air in the wafer stocker 36 are deposited onto a substrate, the acidic and basic gases 30b may adversely influence the electrical properties of the wafer. These organic compounds 30a and acidic and basic gases 30b can be transformed into particulate matter 16 upon irradiation with an UV lamp (low-pressure mercury lamp) (A).

Among particulate matter 16, particles originating in the organic compounds 30a and the basic gas which can be readily adsorbed onto an adsorptive surface such as that of photocatalytic material ($TiO_2$) may deposit (be adsorbed) on the surface of the photocatalyst 32 which has been activated by irradiation with an UV lamp 31, and then be decomposed and removed through photocatalysis (B).

On the other hand, among particulate matter 16, particles originating in acidic gas which cannot be readily decomposed with the photocatalyst 32 pass through the photocatalytically decomposing section B into the trapping and removal section (C) that follows. The section (C) is composed of an UV lamp 19, a photoelectron-emitting material 20, an electrode 21 (a charging part for supplying particulate matter with an electrical charge) and a material for trapping the charged particulate matter 10 with photoelectrons.

In the section (C) for trapping and removing with photoelectrons, inflow particulate matter 16 can be electrically charged with photoelectrons (not shown) emitted from the photoelectron-emitting material 20 and the resultant charged particulate matter can be trapped and removed with a trapping material 10. The photoelectron-emitting material 20 is coated on the UV lamp 19. By forming an electrical field of 50 V/cm between the photoelectron-emitting material 20 and the electrode 21, photoelectrons can be efficiently emitted.

As stated above, particles 16 originating in organic compounds 30a and basic gas can deposit on the surface of the photocatalyst 32 (carried and fixed on the surfaces of surrounding walls and glass rods) that had irradiated with the UV lamp 31 (bactericidal lamp) and can be decomposed and removed efficiently through photocatalysis. In consequence, organic compounds can be decomposed to a concentration of not more than 0.2 ppm, more preferably 0.1 ppm in terms of non-methane organic compounds taken as an indicator.

In other words, organic compounds having a high molecular weight and active organic compounds that are responsible for the increase in the contact angle are decomposed to organic compounds having a low molecular weight that can avoid increasing the contact angle or carbon dioxide and water, depending upon the types of the compounds.

Further, acidic and basic gases present in the air prevailing in the wafer stocker 36 are decreased to the one tenth of the initial concentration. In terms of $SO_2$ and $NH_3$, the concentration of each of $SO_2$ and $NH_3$ in this stocker is decreased to a value of not more than 1 ppb.

Microparticles present in the air 14 of class 100 in the wafer stocker 36 are, together with particulate matter 16 originating in gaseous contaminants as stated above, can be trapped and removed in the section (C) for trapping and removing with photoelectrons in the same manner as described above.

The air 28 which was obtained by using the purification apparatus 12 of the present invention is freed from organic compounds and coexistent gaseous contaminants, resulting in an extremely clean air superior to class 1.

The air 14 in the wafer stocker 34, while flowing in =the form of the air streams 28, 33a, 33b and 14, can be effectively treated during successive passages through the microparticle-producing section (A), the decomposition section for decomposing the microparticles of organic compounds with a photocatalyst (B) and the section for trapping and removing the particulate matter in the form of microparticles (C). These air streams 28, 33a, 33b and 14 are generated as the result of the difference between the temperatures above and below of the purification unit 12, this difference being caused by irradiation with the UV lamp 15, 31 and 19. In the manner as described above, the part D storing the wafer 34 set in a wafer case 35 can be effectively cleaned.

By exposing the surfaces of the wafer 34 to an extremely clean air as stated above, the wafer surfaces can escape from contamination. In consequence, the contact angle on a wafer can avoid increasing. This avoidance of increase in the contact angle has the effects of reinforcing the adhesion of a thin film formed on a wafer substrate (Air Purification, Vol. 33, No. 1, 16–21, 1995).

Ozone generated by irradiation with the UV lamp 15 for producing microparticles can be decomposed and removed to a level of not more than 0.01 ppm by the action of the photocatalyst 32 as stated above and a honeycomb-shaped ozone-decomposing material 27.

Though this example describes about the case in which gas is air, the present invention can of course be applied as well to the cases in which gas is another gas such as nitrogen or argon which is contaminated with organic compounds and gaseous contaminants including acidic and basic gases. The present invention can be applied not only under atmospheric pressure, but also under an increased or decreased pressure.

Figure 10:
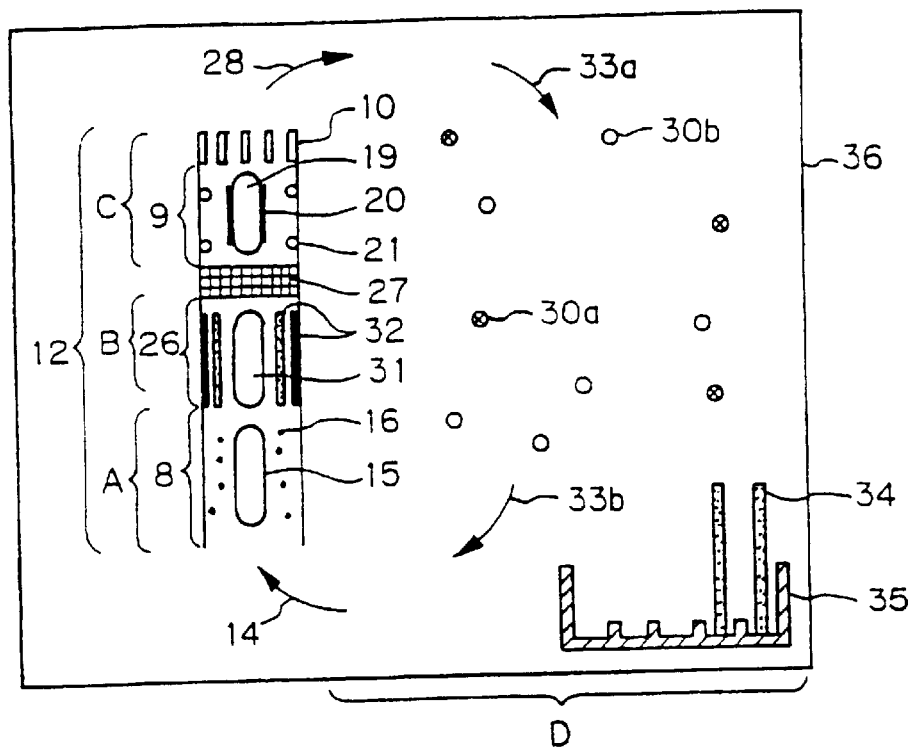
FIG. 10 is a general view of a wafer stocker having a purification apparatus of the present invention disposed therein.

In FIG. 10, reference numerals identical to those in FIG. 5 denote the same elements as those in FIG. 5.

Example 11

Figure 11:
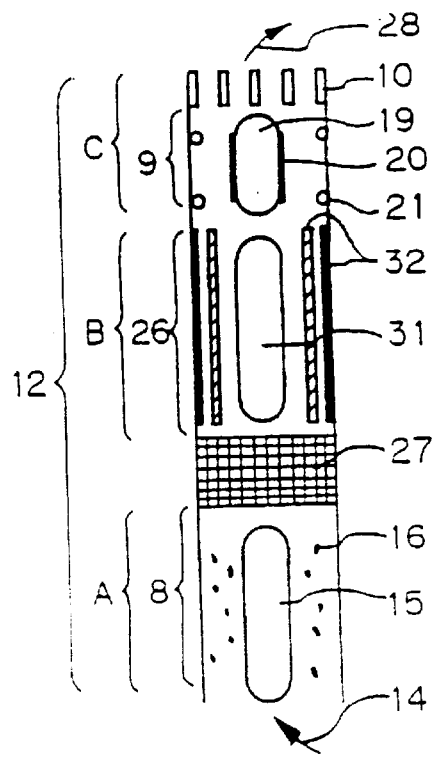
FIG. 11 is a cross-sectional view showing another embodiment of the purification apparatus of the present invention.

FIG. 11 shows a purification apparatus 12 of a type different from that of Example 10 shown in FIG. 10.

As shown in FIG. 11, an ozone-decomposing material 27 and a photocatalytically decomposing section 26 are disposed in the reversed order so that the ozone-decomposing material 27 comes next to the particle-producing section 8 (A). The arrangement shown in FIG. 10 can exhibit the effects comparable to those of the apparatus shown in FIG. 10. In FIG. 11, reference numerals identical to those in FIG. 10 denote the same elements as those in FIG. 10.

Example 12

Figure 12:
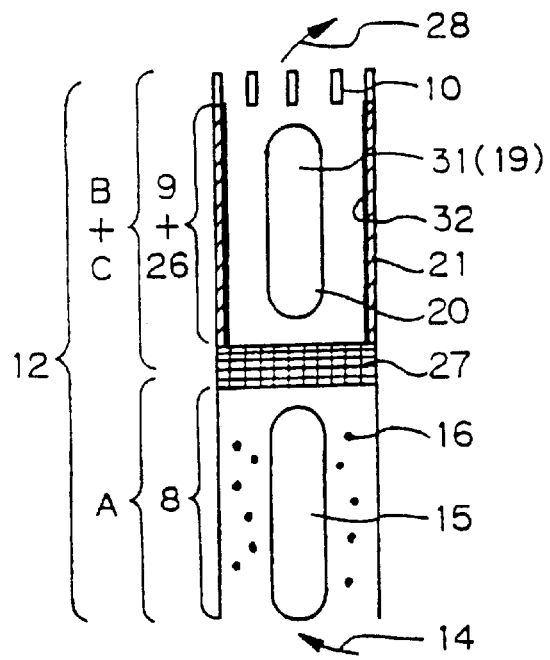
FIG. 12 is a cross-sectional view showing another embodiment of the purification apparatus of the present invention.

FIG. 12 represents a purification unit 12 of a type different from that of Example 10 shown in FIG. 10.

The unit 12 shown in FIG. 12 is modified in such a way that the decomposition section (B) for decomposing the microparticles of organic compounds with a photocatalyst is integrated with the section (C) for trapping and removing the acidic and basic gases in the form of microparticles with photoelectrons.

In other words, the unit is arranged in accordance with the scheme of A→B+C.

Organic compounds 30a as well as acidic and basic gases 30b are transformed into particulate matter 16 (A) by irradiation with an UV lamp (low-pressure mercury lamp) 15.

An integral section composed of photocatalytically decomposing section (B) and the section (C) for trapping the microparticles of particulate matter comprise an UV lamp 31 (19), a photoelectron-emitting material 20, an electrode 21 carrying a photocatalyst 32 and a material 10 for trapping the charged particulate matter.

Among the particulate matter 16, particles originating in organic compounds 30a and basic gas can deposit (be adsorbed) on the surface of the photocatalyst which had been activated by irradiation with the UV lamp 31, and hence can be decomposed and removed through photocatalysis (B).

In a method for removing microparticles by irradiating a photoelectron-emitting material with an ultraviolet radiation in an electrical field, incorporation of a photocatalyst into an electrode forming the electrical field may improve the action of the photocatalyst (Japanese Patent Application No. Hei-8-231290).

On the other hand, among the particulate matter 16, particles originating in acidic and basic gases 30b can be electrically charged with photoelectrons (not shown) emitted from the photoelectron-emitting material 20. The resultant charged particulate matter can be removed by the material 10 for trapping the charged particulate matter. The photoelectron-emitting material 20 is coated onto the UV lamp 19. By forming an electrical field of 50 V/cm between the photoelectron-emitting material 20 and the electrode 21, photoelectrons can be efficiently emitted. Charged particulate matter can be removed by the trapping material 10.

In this manner, the air 14 in the wafer stocker 36 is treated with the unit 12 of the present invention, resulting in the clean air 28. This air 28 is an extremely clean air superior to class 1 in which organic compounds have been decomposed and removed to be a level of not more than 0.01 ppm and the acidic and basic gases 30b such as $SO_2$ and $NH_3$ that had been present in the air 14 in the clean room have been removed to be a level of not more than 1 ppb.

In FIG. 12, reference numerals identical to those in FIG. 10 denote the same element as those in FIG. 10.

Example 13

Figure 13:
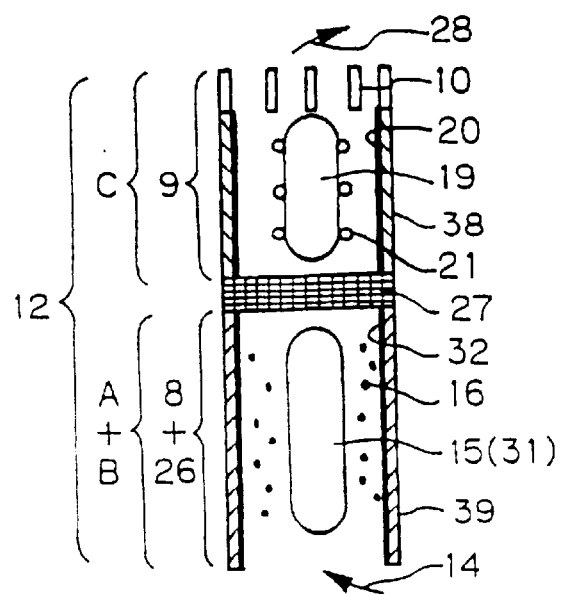
FIG. 13 is a cross-sectional view showing another embodiment of the purification apparatus of the present invention.
Figure 14:
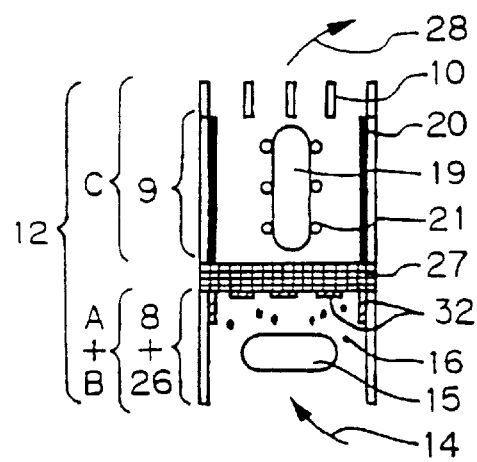
FIG. 14 is a cross-sectional view showing another embodiment of the purification apparatus of the present invention.

FIGS. 13 and 14 represents a purification unit 12 of a type different from that of Example 10 shown in FIG. 10.

The unit 12 shown in the FIGS. 13 and 14 is modified in such a way that the microparticle-producing section 8 (A) is integrated with the decomposition section 26 (B) for decomposing the microparticles of organic compounds by means of a photocatalyst.

In other words, the apparatus of this example is arranged in accordance with the scheme of A+B→C.

The photoelectron-emitting material 20 is formed on the surface of wall-forming materials by Au plating.

In FIG. 13, the photocatalyst 32 is coated on the surface of a wall. The photocatalyst 32 is activated to perform photocatalytic action by irradiation with the UV lamp 15 for producing particles.

In FIG. 14, the photocatalyst 32 is provided on or near the surface of an ozone-decomposing material 27. The photocatalyst 32 is activated to perform photocatalytic action by irradiation with the UV lamp 15 for producing particles.

In FIGS. 13 and 14, reference numerals identical to those in FIG. 10 denote the same element as those in FIG. 10.

Example 14

A sample of gas as specified below was charged into a stocker arranged as shown in FIG. 10, a wafer was placed therein, and then the contact angle on the wafer, the concentrations of non-methane organic compounds, $SO_2$, HCl, $NH_3$ and ozone present in the stocker were measured.

Experimental Conditions
(1) sample gas: air of class 10 in a semiconductor production factory;
concentration of non-methane organic compound: 0.8 to 1.2 ppm;
$SO_2$ concentration: 10 to 30 ppb;
HCl concentration: 3 to 5 ppb;
$NH_3$ concentration: 10 to 20 ppb
(2) stocker volume: 80 liters;
(3) UV lamp for producing particles: low-pressure mercury lamp (184 nm);
(4) photocatalyst: titanium dioxide carried on a glass fiber plate by sol-gel process;
(5) light source: bactericidal lamp (254 nm) (for irradiating a photocatalyst and for emitting photoelectrons);
(6) photoelectron-emitting material: an Au layer having a thickness of 8 nm plated on the above-mentioned bactericidal lamp;
(7) electrode materials and electrical field: for charging: Cu—Zn, 50 V/cm; for trapping particulate matter: Cu—Zn, 500 V/cm
(8) ozone-decomposing material: honeycomb-shaped composite oxide catalyst, $MnO_2/ZrO$—C;
(9) wafer: a highly pure 5 inch silicon wafer was cut into pieces of 1 cm×8 cm and placed in the stocker;
(10) pretreatment of the wafer: washing with a detergent and alcohol on a clean bench in the clean room, followed by $UV/O_3$ cleaning;
(11) measurement of the contact angle: the contact angle was measured with a CA-D type contact angle feeler manufactured by Kyowa Kaimen Kayak, Inc.;
(12) concentration of non-methane organic compound: was measured by gas chromatography (GC) method;
(13) $SO_2$ concentration: was measured by solution conductivity method;
(14) HCl concentration: was measured by absorption liquid method;
(15) $NH_3$ concentration: was measured by chemiluminescent (LCD) method and liquid absorption method;
(16) ozone concentration: was measured with a chemiluminescent ozone densitometer;
(12) opening of the stocker: the stocker was disposed in a clean zone (class 10) of a semiconductor production factory and the open-close cycles were repeated 6 times per day.

Figure 15:
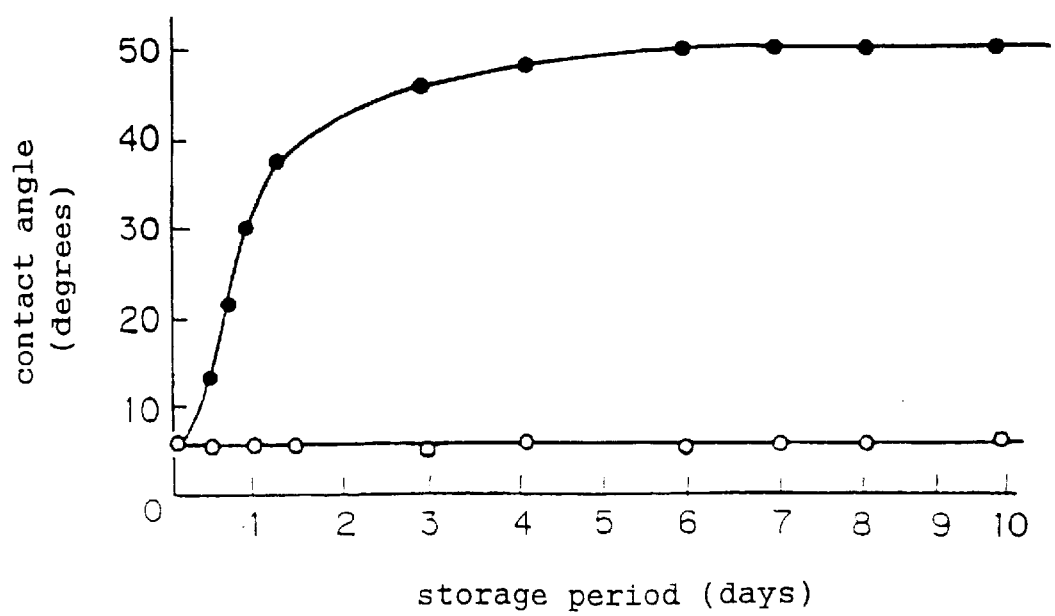
FIG. 15 is a graph of the contact angle (degrees) versus storage period (days) showing the results of Example 14.
Figure 16:
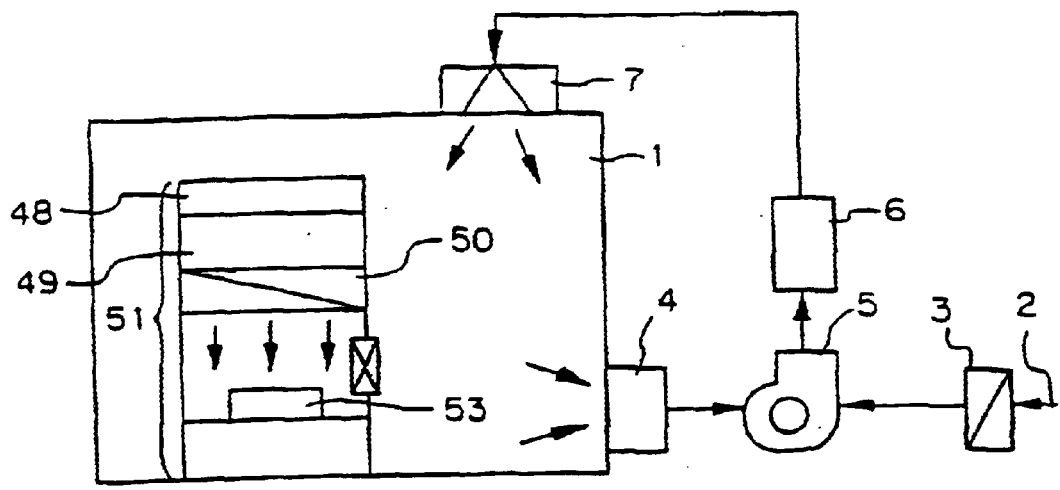
FIG. 16 is a general view of a conventional clean room.
Figure 17:
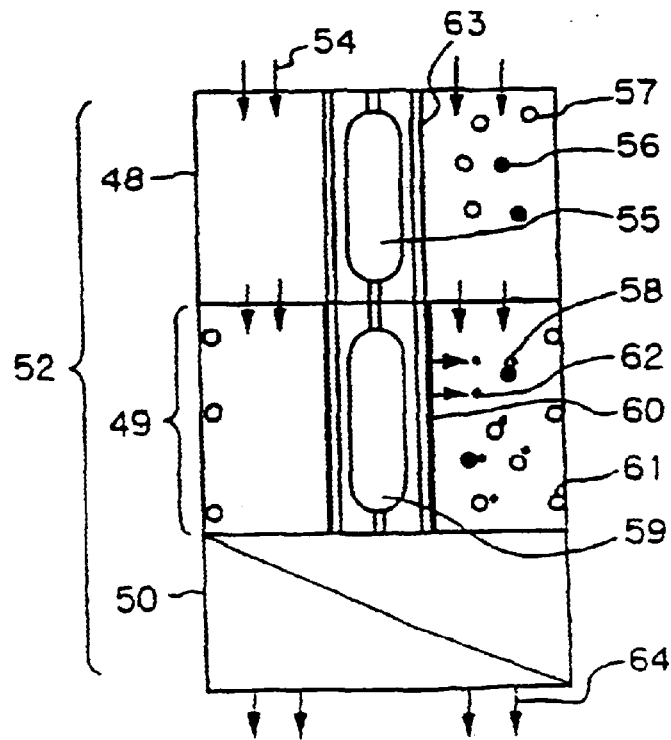
FIG. 17 is an enlarged partial view of an air-purifying section of the apparatus shown in FIG. 16.

Results
(1) FIG. 15 shows the contact angle on a wafer as the function of the number of days during which the wafer was stored in the stocker.

In FIG. 15, the symbol ○ represents the values obtained according to the present invention and the symbol ● represents the values obtained from a (comparative) test in which the wafer was exposed to the air of class 10 in a clean room. The symbol ↓ means that the obtained value is below the limit of detection.

(2) Concentrations of non-methane organic compound, $SO_2$, HCl, $NH_3$ and ozone present in the stocker are shown in the Table 2.

TABLE 2

| storage period (days) | organic compound conc. (ppm) | $SO_2$ conc. (ppb) | HCl conc. (ppb) | $NH_2$ conc. (ppb) | ozone conc. (ppb) |
|---|---|---|---|---|---|
| 1 | <0.1 | <1 | <0.5 | <1 | <0.1 |
| 2 | <0.1 | <1 | <0.5 | <1 | <0.1 |
| 10 | <0.1 | <1 | <0.5 | <1 | <0.1 |

Besides, the concentrations of organic compounds and $SO_2$ (after 1 day of storage) were determined in a similar manner, except that the removal section (C) for trapping with photoelectrons was omitted. The obtained values were respectively <0.1 ppm and 10 to 25 ppb.

The concentration of the microparticles in the stocker was undetectable (after 30 minutes, 1 day and 10 days of storage) with a particle counter. Therefore, the air in the stocker had a purity superior to class 1.

Switching the UV lamp for producing particles generates the ozone concentration of 15 to 20 ppm.

(3) In a stocker without the unit of the present invention, a wafer was stored for 2 or 7 days, Then, the wafer was taken out of the stocker, heated to desorb the organic compounds deposited thereon. Analysis of the wafer by gas chromatography/mass spectrometry (GC/MS) showed the presence of phthalic esters such as DOP. The unit of the present invention was disposed in the stocker and a wafer was treated and analyzed in the same way. Phthalic esters such as DOP was undetectable.

In the embodiment described below, after a gas is cleared of acidic and/or basic gases, organic compounds and residual basic gas can be decomposed with a photocatalyst. Acidic gases which can be mentioned are nitrogen oxides (NOx), nitrogen oxide ion, sulfur oxides (SOx), sulfur oxide ion, hydrogen chloride and hydrogen fluoride. Basic gases which can be mentioned are ammonia and amines.

Example 15

Figure 18:
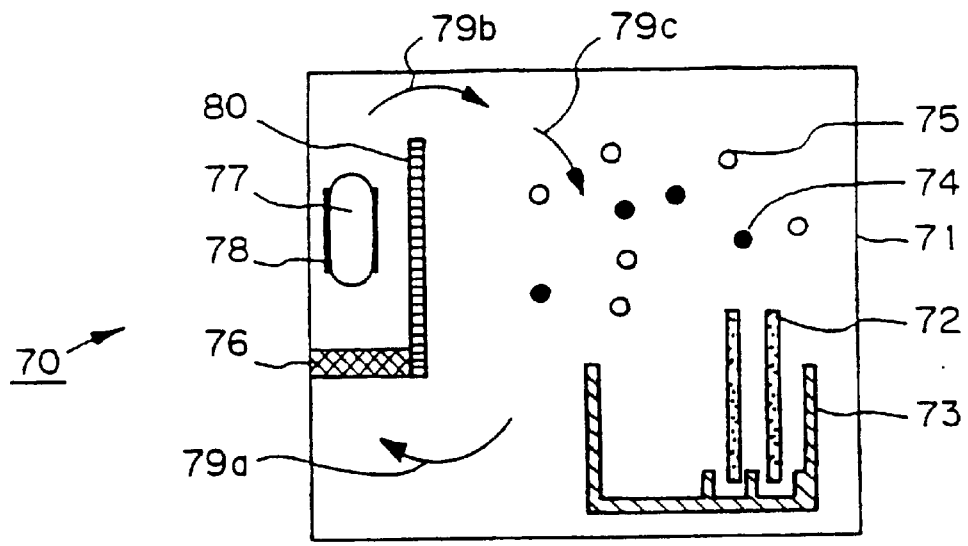
FIG. 18 is a general view of a wafer stocker applying the purification method of the present invention.

FIG. 18 represents a wafer stocker 71. This wafer stocker is disposed in a clean room of class 10,000 in a semiconductor production factory.

1.0 to 1.5 ppm of non-methane hydrocarbons, 30 to 40 ppb of SOx and 60 to 80 ppb of $NH_3$ are present in the clean room. A wafer is placed in the stocker 71 so as to be protected against these gaseous contaminants.

In other words, a wafer carrier 73 holding the wafer 72 can be introduced into or withdrawn from the stocker 71 by opening the door of the stocker 71. At every opening of the door, contaminants present in the clean room penetrate into the stocker 71. These organic compounds 74 may cause the contact angle to increase. SOx may bring about defective insulation of an oxide film. $NH_3$ may bring about defective resolution of a wafer.

The apparatus of the present invention is provided with an ion exchange fiber 76 and a decomposition section situated above the ion exchange fiber. The ion exchange fiber is preferably in the form of a knitted filter.

The decomposition section consists of an UV lamp 77, a catalytically active material coated in the form of a film on the surface of the UV lamp 77 and a light-screening material 80. Catalytically active material is preferably $TiO_2$. The light-screening material 80 is provided for protecting the wafer 72 from irradiation with slight UV leakage of the UV lamp 77.

The UV lamp 77 irradiates the thin film of $TiO_2$ coated on the surface thereof, allowing the $TiO_2$ to perform the photocatalytic action for decomposing organic compounds effectively.

UV irradiation causes, a slight temperature difference between the above and the below of the photocatalyst 78. This temperature difference gives rise to air convection in the stocker 71, thus generating the air streams 79a, 79b and 79c circulating in the stocker. As a result, air passes through the ion exchange fiber 76 and comes into contact with the photocatalyst 78 that follows.

First, acidic and basic gases are removed with the ion exchange fiber 76. Acidic gases can be removed with an anionic ion exchange fiber, whereas basic gases can be removed with a cationic ion exchange fiber. Organic compounds 74 present in the air, having passed through the ion exchange fiber, are decomposed with the photocatalyst.

The air in the clean room contains organic compounds in a concentration of 1.0 to 1.5 ppm, SOx in a concentration of 30 to 40 ppb and $NH_3$ in a concentration of 60 to 80 ppb. These contaminants penetrate into the stocker 71 on opening of the stocker 71. By virtue of the apparatus of the present invention, organic compounds can be decomposed to a level of not more than 0.1 ppm in terms of non-methane hydrocarbons taken as an indicator. At the same time, SOx and $NH_3$ can be trapped with the ion exchange fiber 76, thereby removed to a level of not more than 1 ppb. As the result, the wafer 72 stored in the stocker 71 can be maintained with no increase in the contact angle, no defective insulation and no defective resolution.

The present invention can be applied to not only air in a clean room as usual but also various gases, e.g. $N_2$ and Ar, as well.

In FIG. 18, it is preferred to dispose between the ion exchange fiber 76 and the UV lamp 77 an additional section having an UV lamp for producing microparticles of organic compounds and organosilicon compounds. Alternatively, the UV lamp 77 and the photocatalyst 78 shown in FIG. 18 can be replaced by the microparticle-producing section 8 and the decomposition section 26 shown in FIG. 2.

Example 16

Figure 19:
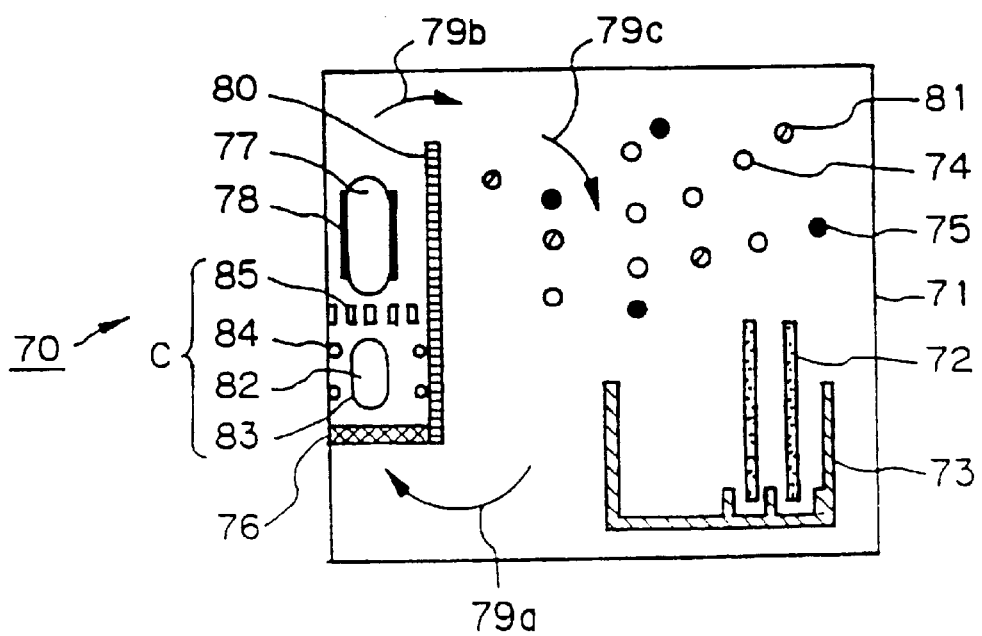
FIG. 19 is a general view of a wafer stocker applying another purification method of the present invention.

FIG. 19 represents another embodiment of a wafer stocker 71. This wafer stocker is disposed in a clean room of class 10,000 of a semiconductor production factory in a manner similar to Example 15.

In example 16, by opening the stocker 71, organic compounds 74, SOx and $NH_3$ 75 as well as particulate matter 81 (microparticles) including ions such as $NO_3^-$, $NO_2^-$ and $SO_4^-$ penetrate into the stocker 71.

Thus, unlike the apparatus of example 15 shown in FIG. 18, the section C is disposed for charging and trapping the microparticles 81 with photoelectrons. More precisely, the section C consists of an UV lamp 82, a photoelectron-emitting material 83 coated on the surface of the UV lamp 82, an electrode 84 surrounding the UV lamp 82 for emitting photoelectrons and a trapping material 85 disposed downstream to the UV lamp for trapping charged microparticles.

The photoelectron-emitting material 83 of this example is coated on the surface of the UV lamp 82 so as to form an integrated device (Laid Open Japanese Patent Application No. Hei-4-243540). The electrode 84 serves to generate an electrical field (photoelectron-emitting material (−) and electrode (+)) so that the photoelectron-emitting material 83 may emit photoelectrons efficiently.

In the stocker 71, microparticles 81 are carried by air streams 79a to 79c that are circulating in the apparatus of the present invention. First, SOx and $NH_3$ are trapped and removed with an ion exchange fiber 76. Second, particulate matter including $NO_3^-$, $NO_2^-$ and $SO_4^{2-}$ are trapped and removed in the section C after being electrically charged with photoelectrons. In the section C of this embodiment, microparticles are electrically charged with the photoelectrons that had been emitted from the photoelectron-emitting material 83 upon irradiation with the UV lamp 82, to become charged microparticles, which can be in turn trapped and removed with the trapping material 85 placed downstream. Organic compounds 74 present in the air that had passed through the trapping material 85 can be decomposed with the photocatalyst 78.

As stated above, purified air that has been cleared of acidic and basic gases, ion-containing particulate matter as well as gaseous organic compounds is present in the space B shown in FIG. 19. In other words, SOx and $NH_3$ are decreased to a level of not more than 1 ppb and organic compounds are decreased to a level of not more than 0.1 ppm, thus creating a purified space superior to class 1.

In FIG. 19, reference numerals identical to those in FIG. 18 denote the same element as those in FIG. 18.

In FIG. 19, it is preferred to dispose an additional section between the trapping material 85 and the UV lamp 77 for producing microparticles of organic compounds and organosilicon compounds. Alternatively, the UV lamp 77 and the photocatalyst 78 shown in FIG. 19 may be replaced by the microparticle-producing section 8 and the decomposition section 26 shown in FIG. 2.

Example 17

Figure 20:
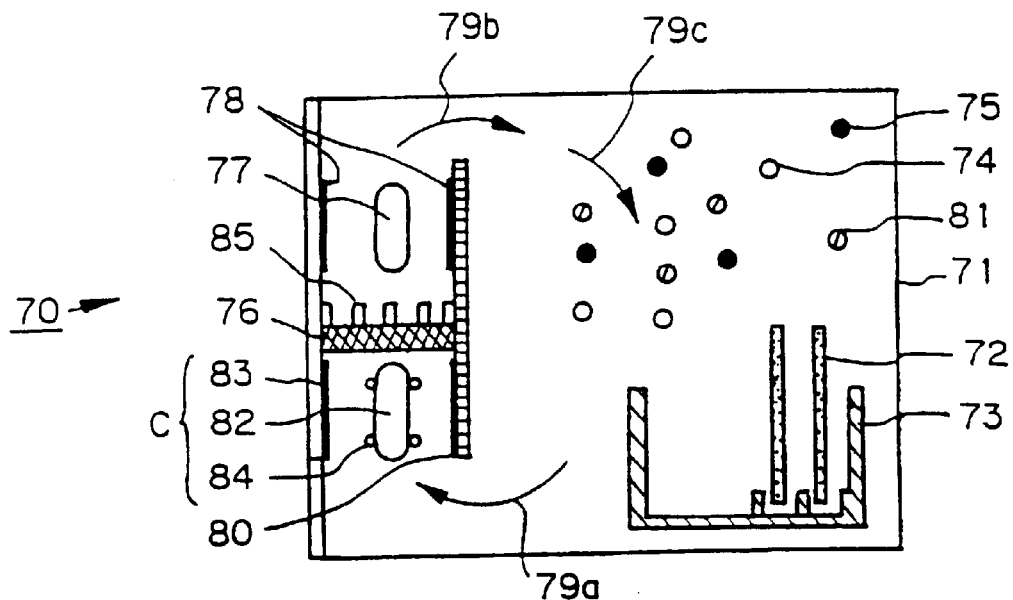
FIG. 20 is a general view of a wafer stocker applying another purification method of the present invention.

FIG. 20 represents an embodiment other than that shown in FIG. 19.

In the embodiment shown in FIG. 20, the ion exchange fiber 76 and the trapping section 85 shown in FIG. 19 are formed as an integral section for trapping and removing acidic and basic gases. In FIG. 20, reference numerals identical to those in FIG. 19 denote the same element as those in FIG. 19.

As shown in FIG. 20, the UV lamp 82 is placed upstream to the ion exchange fiber 76, which in turn is placed upstream to the trapping section 85. The ion exchange fiber 76 and the trapping section 85 are integrated. A photoelectron-emitting material 83 is coated on the wall opposite to the UV lamp 82, not on the surface of the UV lamp 82. A photocatalyst 78 is coated also on the wall opposite to the UV lamp 77.

In this example, particulate matter 81 including $NO_3^-$, $NO_2^-$ and $SO_4^{2-}$ are first trapped and removed in the trapping section (C) by being charged electrically with photoelectrons. Second, acidic and basic gases including SOx and NH$_3$ are trapped and removed with the ion exchange fiber 76. And finally, organic compounds 74 are decomposed with the photocatalyst 78 and removed.

As stated above, purified air that is free from acidic and basic gases, ion-containing particulate matter as well as gaseous contaminants (organic compounds) is present in the space B shown in FIG. 20 (SOx and NH$_3$: not more than 1 ppb; organic compounds: not more than 0.1 ppm), thus creating an extremely purified space superior to class 1. A wafer placed in this space B can be protected from an increase in the contact angle, defective insulation of oxide film, defective resolution, as well as circuit breakage and shortage.

In FIG. 20, it is preferred to dispose between the trapping material 85 and the UV lamp 77 an additional section having an UV lamp for producing microparticles of organic compounds and organosilicon compounds. Alternatively, the UV lamp 77 and the photocatalyst 78 in FIG. 20 can be replaced by the microparticle-producing section 8 and the decomposition section 26 shown in FIG. 2.

Example 18

Figure 21:
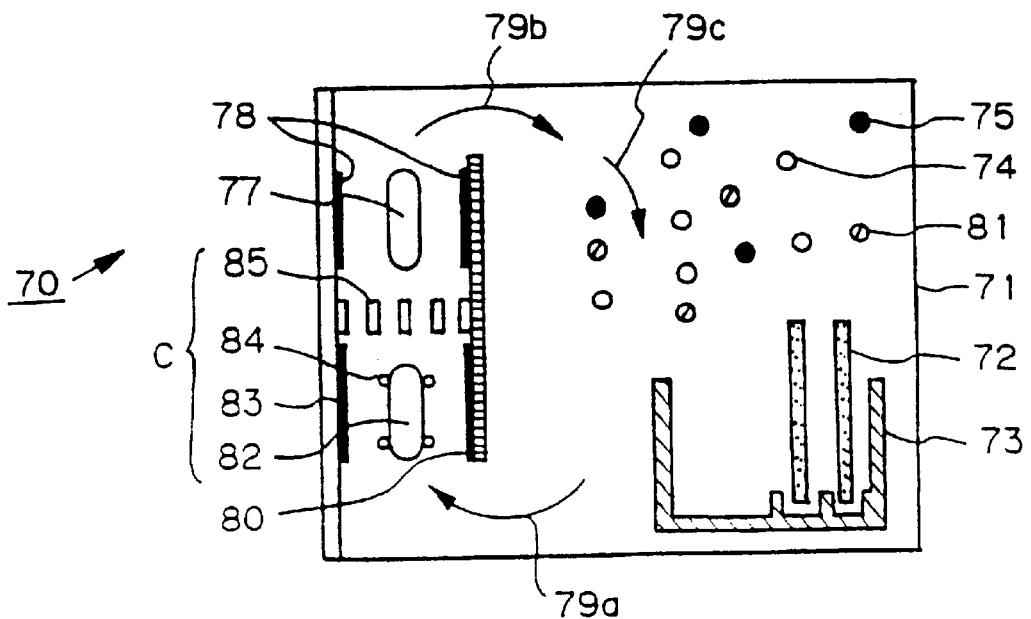
FIG. 21 is a general view of a wafer stocker applying another purification method of the present invention.

FIG. 21 represents an embodiment of a type other than that shown in FIG. 19.

In the embodiment shown in FIG. 21, ion exchange fiber is omitted, and hence acidic and basic gases are removed in a trapping section C only by being charged electrically by photoelectrons.

This embodiment is suitable for use in purifying a gas of the type that contains acidic and basic gases such as SOx and NHx at a relatively low concentration and ion-containing microparticles such as NO$_3^-$, NO$_2^-$ and SO$_4^{3-}$ at a relatively high concentration.

An UV lamp 82 irradiates a photoelectron-emitting material 83, allowing the latter to emit photoelectrons. The photoelectrons can supply the particles with an electrical charge and the resultant charged particles can be removed in a trapping section 85. Then, a photocatalyst 78 irradiated with an UV lamp 77 can oxidatively decompose the organic compounds and basic gases.

In FIG. 21, it is preferred to dispose between the trapping material 85 and the UV lamp 77 an additional section having an UV lamp for producing microparticles of organic compounds and organosilicon compounds. Alternatively, the UV lamp 77 and the photocatalyst 78 shown in FIG. 21 may be replaced by the microparticle-producing section 8 and the decomposition section 26 shown in FIG. 2.

In FIG. 21, reference numerals identical to those in FIGS. 18 to 20 denote the same element as those in FIGS. 18 to 20.

Example 19

Figure 22:
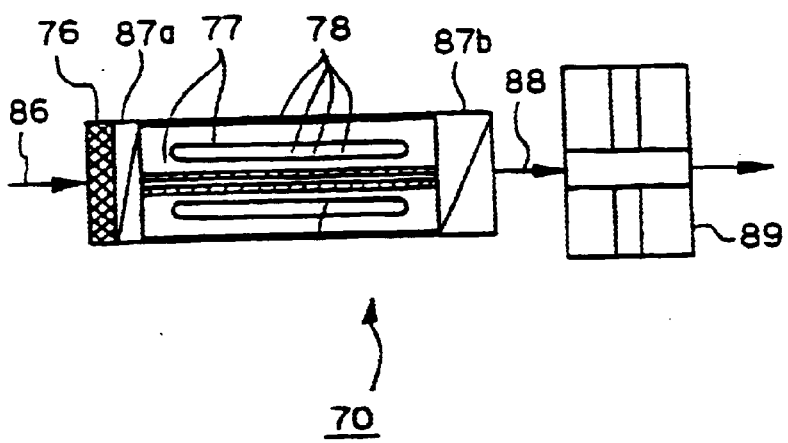
FIG. 22 is a schematic view showing the purification of air for feeding an air knife by applying another purification method of the present invention.

FIG. 22 represents an embodiment of the purification apparatus 70 of the present invention applied to purify air for feeding an air knife device 89. The purification apparatus 70 and the air knife device 89 are disposed in a clean room of class 10,000 of a semiconductor production factory.

The purification apparatus of the present invention comprises successively downstream an ion exchange fiber in the form of a filter 76, a dust-removing filter 87*a*, a decomposition section and a dust-removing filter 87*b*. The decomposition section is composed of an axially extending UV lamp 77 and a photocatalyst 78. The photocatalyst 78 is coated on the inner surface of a housing. A glass rod is placed in the axial direction of the decomposition section in parallel to the UV lamp and has the surface which is also coated with a catalytically active material.

Non-methane hydrocarbons are present in the concentration of 1.1 to 1.3 ppm in the clean room of class 10,000. SOx, NOx and NH$_3$ are present in the concentration of 40 ppb, 30 ppb and 150 ppb (average concentration), respectively.

From the air 16 in the clean room, acidic and basic gases are removed first by trapping action of the ion exchange fiber 76 until the concentrations of SOx and NH$_3$ taken as contamination indicators are decreased each to a level of not more than 1 ppb. Then, microparticles present in the air in the clean room are removed with the dust-removing filter 87*a*.

Then, with the aid of the photocatalyst (TiO$_2$) 78 which had been activated by UV radiation emitted from the UV lamp 77, organic compounds are decomposed until the concentration of non-methane hydrocarbons taken as contamination indicator are decreased to a level of not more than 0.1 ppm.

Filters suitable for use as the dust-removing filter 87*b* (dust-removing section) are those that in case of emergency can efficiently trap the microparticles which eventually flow out at or near the ion exchange fiber and the organic compound-decomposing section. An ULPA filter is used in this embodiment.

An extremely pure air 88 that is superior to class 1 (NOx, SOx, NH$_3$: below 1 ppb; organic compounds: below 0.1 ppm) and is free from acidic and basic gases as well as particulate matter and gaseous contaminants (organic compounds) can be obtained in a manner as described above. The obtained extremely pure air 88 is fed to the air knife device 89.

In FIG. 22, it is preferred to dispose an additional section between the filter 87*a* and the decomposition section composed of the UV lamp 77 and the photocatalyst 78, the additional section being a microparticle-producing section having an UV lamp for producing microparticles of organic compounds and organosilicon compounds. Alternatively, the UV lamp 77 and the photocatalyst 78 shown in FIG. 22 can be replaced by the microparticle-producing section 8 and the decomposition section 26 shown in FIG. 2.

Example 20

A sample of gas as specified below was charged into a stocker as shown in FIG. 18 and the open-close cycles were repeated 10 times per day. The contact angle on the wafer stored in the stocker was measured under a long-term continuous operation. The concentrations of non-methane hydrocarbons and SOx in the air present in the stocker were measured and the hydrocarbons deposited on the wafer in the stocker were identified.

Figure 23:
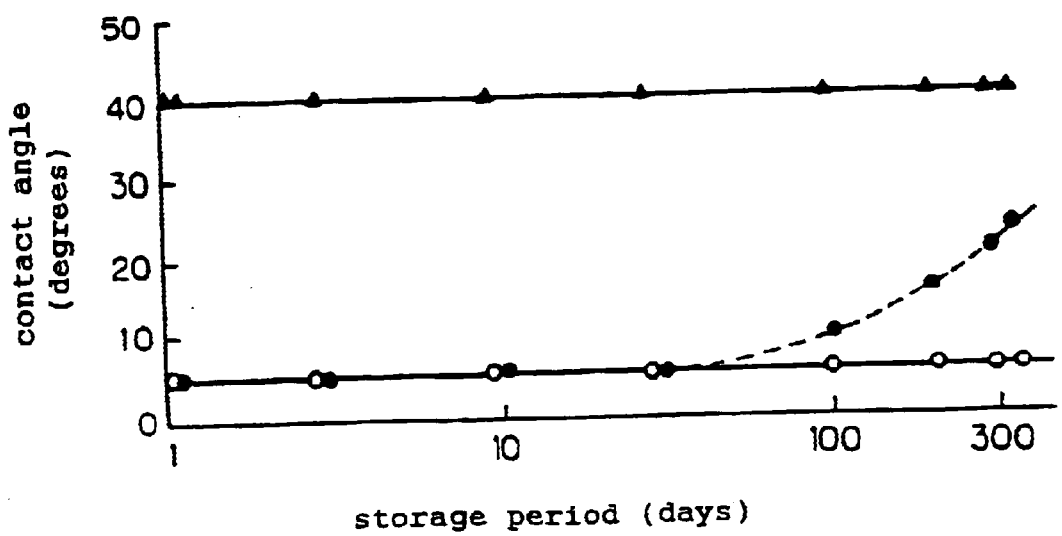
FIG. 23 is a graph showing the change of the contact angle (degrees) as the function of time (days).

Sample gas: air of class 10 in a clean room
    concentration of non-methane hydrocarbon: 1.2 to 1.5 ppm
    Sox concentration: 40 to 60 ppb;
Stocker volume: 80 liters;
Light source: low-pressure mercury lamp (with peaks at 184 nm and 254 nm);
Photocatalyst: TiO$_2$;
The way of carrying photocatalyst on the light source: TiO$_2$ was coated onto the surface of the mercury lamp to a thickness of 50 nm by sol-gel method;
Means for trapping and removing acidic and basic gases: an ion exchange fiber (anion-type) or a fibrous active charcoal;

Fabrication of the ion exchange fiber: anion exchange fiber: graft polymerization of fibrous polypropylene was carried out by exposing to an electron beam of 20 Mrad under nitrogen and then immersing in a solution consisting of hydroxystyrene monomer and isoprene. Quaternary amination of the reaction product afforded an anion exchange filter;

Measurement of the contact angle: a method for measuring the contact angle of a water drop (manufactured by Kyowa Kaimen Kagaku Inc., CA-DT type);

FIG. 23 and exhibited an increase in the contact angle of below 2 degrees after 300-day operation.

(2) Organic Compounds in the Stocker

The concentrations of non-methane hydrocarbons and SOx as well as the identification of the hydrocarbons adsorbed on the wafer (presence or absence of the identified components) are shown in the table 3. The results obtained by using a control having an ion exchange fiber without photocatalyst or a control having a photocatalyst without ion exchange fiber are also shown in the table 3.

TABLE 3

| storage period (days) | conditions | hydrocarbon conc. in the air (ppm) | deposition on the wafer | SOx conc. in the air (ppb) |
|---|---|---|---|---|
| 1 | invention | <0.1 | absent | <1 |
|   | no photocatalyst | 1.2~1.5 | present | <1 |
|   | no ion exchange fiber | <0.1 | absent | 5~7 |
| 10 | invention | <0.1 | absent | <1 |
|   | no photocatalyst | 1.2~1.5 | present | <1 |
|   | no ion exchange fiber | <0.1 | absent | 5~7 |
| 100 | invention | <0.1 | absent | <1 |
|   | no photocatalyst | 1.2~1.5 | present | <1 |
|   | no ion exchange fiber | <0.1 | absent | 10~15 |
| 300 | invention | <0.1 | absent | <1 |
|   | no photocatalyst | 1.2~1.5 | present | <1 |
|   | no ion exchange fiber | 0.5~0.8 | absent | 15~20 |

Concentration of non-methane hydrocarbons in the stocker: was measured by gas chromatography (GC) method;

Concentration of SOx in the stocker: was measured by solution conductivity method;

Identification of the hydrocarbons adsorbed on the wafer: GC/MS method;

Wafer stored in the stocker: a highly pure 5-inch silicon wafer was cut into pieces of 1 cm×8 cm and pretreated as stated below prior to introduction into the stocker;

Pretreatment of the wafer: washing with a detergent and alcohol on a clean bench in the clean room, followed by UV/$O_3$ cleaning. The wafer was exposed to UV radiation under the conditions allowing $O_3$ evolution.

Results (1) The Contact Angle on the Wafer

FIG. 23 shows the contact angle (in degrees) as the function of the number of days when an ion exchange fiber was employed. In FIG. 23, the symbol -○- represents the combination of an ion exchange fiber and a photocatalyst (present invention), the symbol -●- represents a control without ion exchange fiber and the symbol -▲- represents a control without photocatalyst.

The control without photocatalyst showed the contact angle of 20 degrees at 20 hours after and 40 degrees at 60 hours after, thus no preventive effect was observed on the increase in the contact angle. The measured values as long as the 350th day are shown in FIG. 23. When an ion exchange fiber was disposed at the inlet in the manner as shown in FIG. 22, the apparatus could maintain a high performance without deterioration with time.

The control applying a fibrous active charcoal in place of an ion exchange fiber for trapping and removing acidic and basic gases showed the results similar to those shown in In table 3, the hydrocarbon deposited on the wafer was phthalic ester such as DOP.

Example 21

The same apparatus as that used in the example 21 was used, except that a photocatalyst was employed and an ion exchange fiber was omitted. The number of days required for a 5 degree increase in the contact angle was observed as the function of the SOx concentration by using a sample gas adjusted to a SOx concentration of 1 to 50 ppb. Other experimental conditions were same as those used in Example 20.

Sample gas: air of class 10 in a clean room

Concentration of non-methane hydrocarbon: 1.2 to 1.5 ppm

SOx concentration: 1 to 50 ppb

The concentration of SOx was appropriately adjusted by regulating the passing speed of the gas through the ion exchange fiber for removing a part of SOx as desired.

Results

Figure 24:
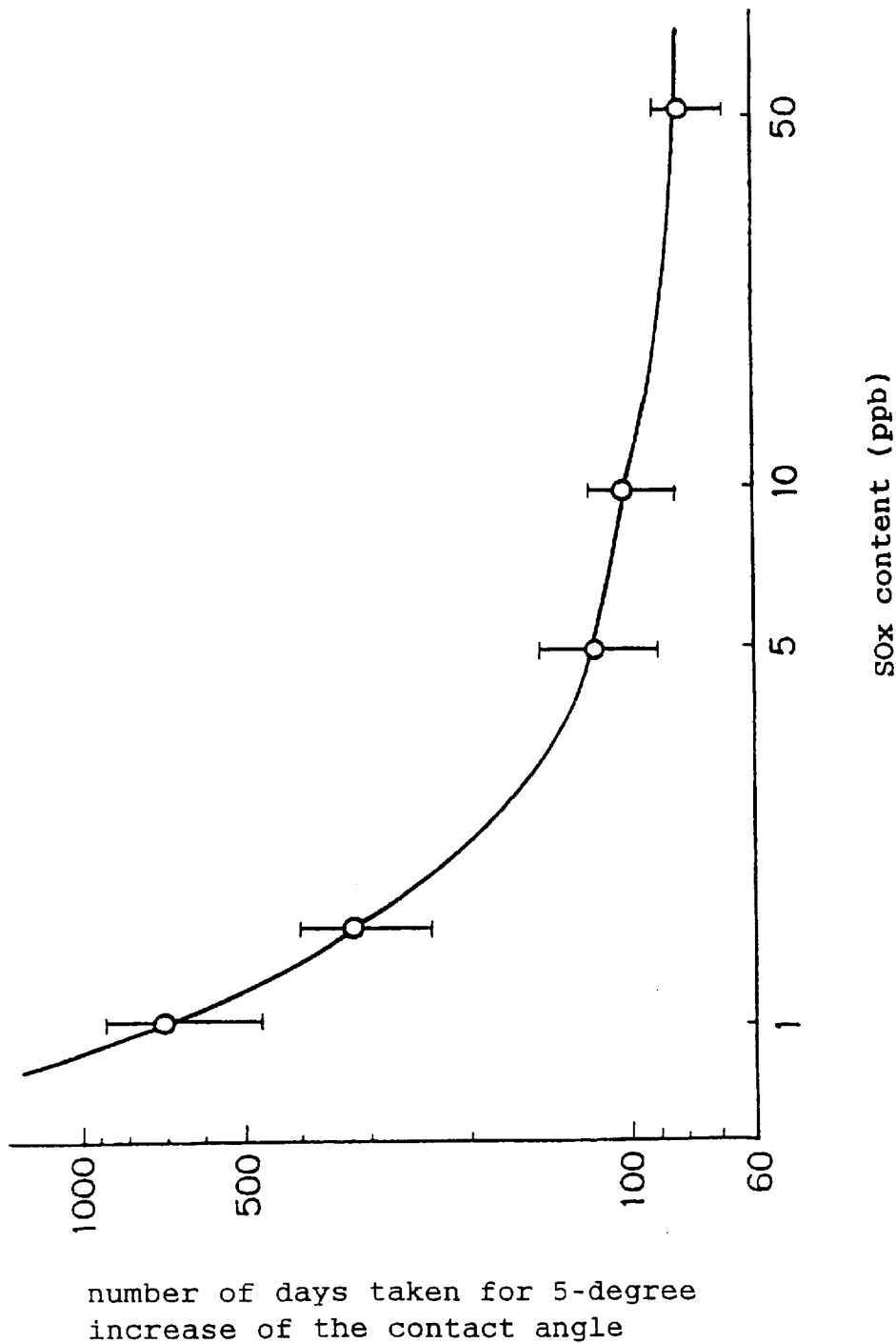
FIG. 24 is a graph showing the number of days taken for 5-degree increase in the contact angle as the function of SOx concentration.

FIG. 24 represents the number of days required for a 5 degree increase in the contact angle versus the SOx concentration in the sample gas. It was obvious that the less was the concentration of sulfur oxides in a sample gas, the more was the number of days required for increase in the contact angle. In other words, the air was kept clean for longer.

FIGS. 25(*a*) and 25(*b*) are a total ion chromatogram obtained by gas chromatography/mass spectrography of organic compounds in the air. The axis of abscissa x represents the mass of an ion and the axis of ordinate y represents a relative strength. 30 liters of sample air was flown into an adsorbent (TENAX-GR) at a rate of 0.5 liter/min. The adsorbent was heated in a device for concentration and introduction (manufactured by CHROMPACK Inc., CP4010 model) so as to desorb the adsorbed gas, which was cooled with liquid nitrogen, concentrated and measured in a gas chromatography/mass spectrometry device (manufactured by Shimazu Seisakusho Inc., QP-1100EX model).

Figure 25A:
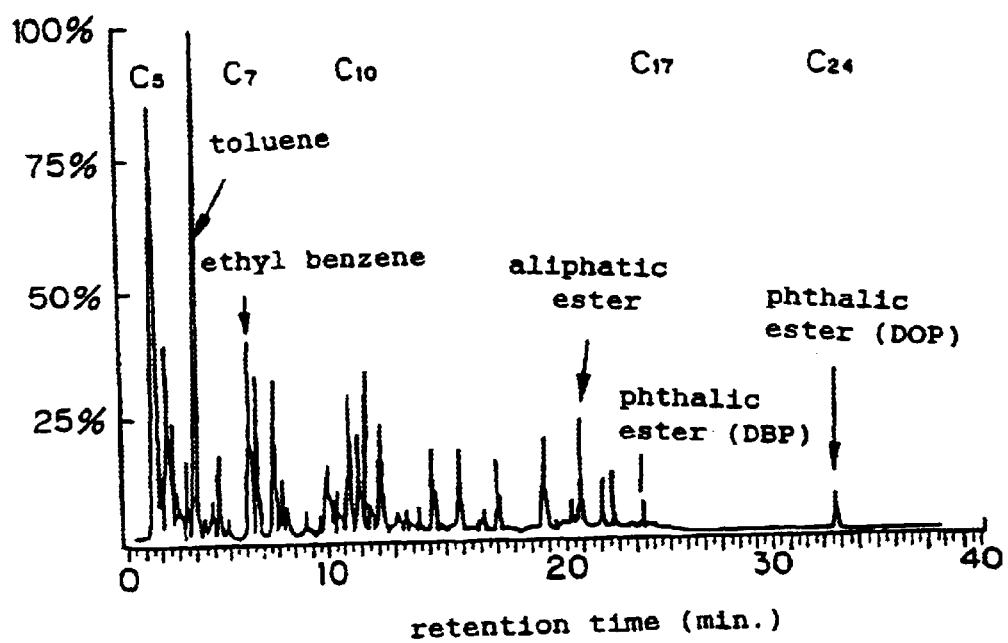
FIGS. 25(a) and 25(b) are a total ion chromatogram of hydrocarbons present in the air obtained by gas chromatography/mass spectrometry (GC/VS) method.

FIG. 25(a) is a graph showing the results of the air of class 10,000 in a clean room. Non-methane hydrocarbons are present in a concentration of 1.1 to 1.3 ppm and SOx, NOx and $NH_3$ are present in a concentration of 40 ppb, 30 ppb and 150 ppb (average concentration) respectively. Each peak represents the presence of an organic compound.

Figure 25B:
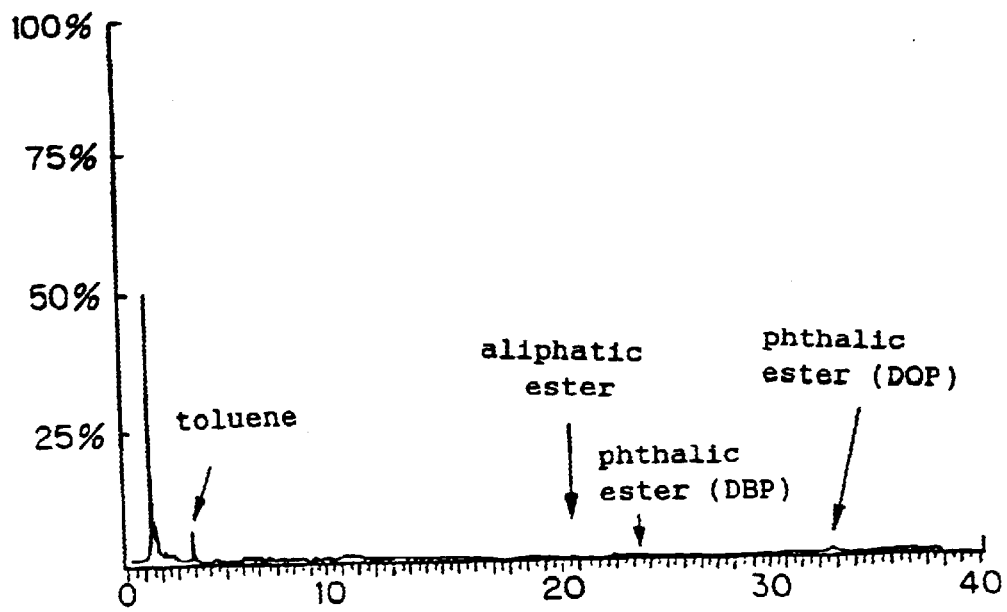

FIG. 25(b) is a graph showing the results of the air of class 10,000 in a clean room after treated by the apparatus of the present invention. It is obvious that the amount of organic compounds was drastically decreased.

The present invention, by producing microparticles of contaminants and concentrating them locally, can decompose the contaminants with a photocatalyst effectively, even when the contaminants are present at low concentration. Contaminants such as organic compounds in the air, even when they are present at low concentration, can be efficiently decomposed because they are made into microparticles and brought into contact with a photocatalyst in the concentrated form. As a result, the decomposition rate of organic compounds was improved. The photocatalyst is effective in decomposing oxidizable compounds including gaseous organic compounds such as phthalic ester, gaseous organosilicon compounds such as siloxane and basic gas such as ammonia. The present invention is particularly advantageous in view of the fact that gaseous organic compounds and gaseous organosilicon compounds are difficult to remove by photoelectronical charging or with a filter or an ion exchange fiber.

When a removal section utilizing a filter, an adsorbent, a photoelectron and an ion exchange resin is provided, other gaseous contaminants which are present together with organic compounds, including acidic gases such as $SO_2$, NOx, HCl, HF and the like as well as basic gases such $NH_3$, amines and the like can also be removed. In other words, a wide variety of contaminants ranging from gas to particles can be removed.

In addition, when acidic and basic gases are removed prior to the treatment with a photocatalyst, adverse effects on the photocatalyst by the acidic and basic gases can be avoided. In consequence, the photocatalyst can act reliably over a long period, thus allowing long-term operation.

By way of an illustrative application, the present invention was described mainly with reference to a clean room of semiconductor production factories.

The present invention are also suitable to other applications as set forth below:
(1) Air purification for public welfare, for example, purification of air in offices, buildings, houses, hospitals, hotels and the like;
(2) Purification of exhaust gases originating in various industries including sewer drains and waste disposal sites; purification of industrial atmosphere; as well as purification of exhaust gases originating in underground parking areas and tunnel ventilators; and
(3) Purification of air and gases including nitrogen, oxygen and the like for use in gas production units for feeding clean rooms, clean booths, clean tunnels, clean benches, safety cabinets, bioclean boxes, sterile rooms, path boxes, precious article stockers, transportation spaces, interfaces, air curtains, air knives, drying sections, production lines and the like in pioneer industries such as semiconductor industries, electronic industries, pharmaceutical industries, food industries, agricultural and forestry industries, medical industries, precision machinery industries and the like.

Public welfare was mentioned in consideration of the fact that gaseous contaminants present in the air may adversely affect human health producing so-called sick building syndrome.

What is claimed is:

1. An apparatus for purifying a gas containing a contaminant, comprising:

a microparticle-producing section having a source for emitting an ultraviolet ray, a radiation ray or a combination of an ultraviolet ray and a radiation ray;

a decomposition section comprising
  $TiO_2$ as a photocatalyst, and
  a light source for irradiating said photocatalyst with light; and a removal section for removing an acidic compound or a basic compound;

wherein said photocatalyst is fixed to a matrix in the shape of a honeycomb, a wire cloth, a fiber, a rod or a filter; or wherein said photocatalyst is coated on a surface of a wall, a floor or a ceiling that defines a space prevailed by the flow of a gas to be treated; and wherein said decomposition section is connected to said microparticle-producing section.

2. The apparatus of claim 1, further comprising a gas inlet; and a gas outlet;

wherein said gas inlet, said microparticle-producing section, said decomposition section and said gas outlet are disposed successively downstream.

3. The apparatus of claim 1, wherein said microparticle-producing section is followed downstream by an ozone-decomposing material.

4. The apparatus of claim 1, wherein said removal section comprises one or more members selected from the group consisting of a filter, an adsorbent, an ion exchange material, a photoelectron-emitting means and a means for trapping a charged contaminant.

5. The apparatus of claim 1, wherein said rays emitted from said source are capable of transforming gaseous contaminants into microparticles or particulate matter.

6. The apparatus of claim 5, wherein said gaseous contaminants are $SO_2$, $NH_3$ or a mixture thereof.

7. The apparatus of claim 5, wherein said gaseous contaminants are higher aliphatic acids, phenol derivatives, phthalic esters, organosilane compounds, or mixtures thereof.

8. The apparatus of claim 5, wherein said photocatalyst promotes decomposing said microparticles or said particulate matter.

9. The apparatus of claim 1, further comprising an ozone decomposing material.

10. The apparatus of claim 9, wherein said ozone decomposing material is selected from the group consisting of a manganese dioxide, $MnO_2/TiO_2$—C, $MnO_2/ZrO$—C and charcoal.

11. A stocker suitable for use in a clean room, comprising:

a microparticle-producing section that is disposed in said stocker and provided with a source for emitting an ultraviolet ray, a radiation ray or a combination of an ultraviolet ray and a radiation ray, to produce microparticles; and a decomposition section that is disposed in said stocker and comprises
  $TiO_2$ as a photocatalyst, and
  a light source for irradiating said photocatalyst with light; and a removal section for removing an acidic compound or a basic compound;

wherein said photocatalyst is fixed to a matrix in the shape of a honeycomb a wire cloth, a fiber, a rod or a filter; or wherein said photocatalyst is coated on a surface of a wall, a floor or a ceiling that defines a space prevailed by the flow of a gas to be treated; and wherein said decomposition section is connected to said microparticle-producing section.

* * * * *